United States Patent
Roimela et al.

(10) Patent No.: US 10,338,412 B2
(45) Date of Patent: Jul. 2, 2019

(54) CONTROL OF A PERIODIC LIGHT SOURCE ILLUMINATING A ROOM SHARED BY TWO USERS WEARING SHUTTER GLASSES SYNCHRONIZED WITH THE LIGHT SOURCE

(71) Applicant: Nokia Technologies Oy, Espoo (FI)

(72) Inventors: Kimmo Roimela, Tampere (FI); Antti Eronen, Tampere (FI); Arto Lehtiniemi, Lempaala (FI); Jussi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 15 days.

(21) Appl. No.: 15/543,279

(22) PCT Filed: Jan. 13, 2016

(86) PCT No.: PCT/FI2016/050013
§ 371 (c)(1),
(2) Date: Jul. 13, 2017

(87) PCT Pub. No.: WO2016/113467
PCT Pub. Date: Jul. 21, 2016

(65) Prior Publication Data
US 2017/0371183 A1 Dec. 28, 2017

(30) Foreign Application Priority Data
Jan. 15, 2015 (EP) .................................. 15151242

(51) Int. Cl.
*G02C 7/10* (2006.01)
*H05B 37/02* (2006.01)
(Continued)

(52) U.S. Cl.
CPC ........... *G02C 7/101* (2013.01); *H05B 37/029* (2013.01); *H05B 37/0272* (2013.01);
(Continued)

(58) Field of Classification Search
CPC ............ H05B 37/0272; H05B 37/0281; G02B 2027/0178; G02C 7/101
(Continued)

(56) References Cited

U.S. PATENT DOCUMENTS 6,188,442 B1 2/2001 Narayanaswami ........... 348/564
2011/0043881 A1 2/2011 Elferich ........................ 359/227
(Continued)

FOREIGN PATENT DOCUMENTS

EP 2 441 315 12/2010

*Primary Examiner* — Collin X Beatty
*Assistant Examiner* — Grant A Gagnon
(74) *Attorney, Agent, or Firm* — Harrington & Smith

(57) ABSTRACT

A method including receiving information indicative of a first light preference profile, receiving information indicative of a second light preference profile, determining that the first light preference profile differs from the second light preference profile, determining a first light control setting based on the first light preference profile, determining a second light control setting based on the second light preference profile, determining a periodic light source actuation directive, causing sending of the periodic light source actuation directive to the light source, determining a first shutter control directive for the first near eye apparatus, causing sending of the first shutter control directive to the first near eye apparatus, determining a second shutter control directive for the second near eye apparatus, and causing sending of the second shutter control directive to the second near eye apparatus is disclosed.

15 Claims, 11 Drawing Sheets

(51) Int. Cl.
*G02B 27/01* (2006.01)
*H04N 13/341* (2018.01)

(52) U.S. Cl.
CPC . *H05B 37/0281* (2013.01); *G02B 2027/0178* (2013.01); *H04N 13/341* (2018.05)

(58) Field of Classification Search
USPC .......................................................... 351/44
See application file for complete search history.

(56) References Cited

U.S. PATENT DOCUMENTS

| | | | |
|---|---|---|---|
| 2012/0023540 A1 | 1/2012 | Meuninck et al. | 725/118 |
| 2012/0173382 A1 | 7/2012 | Loveland | 705/26.5 |

CONTROL OF A PERIODIC LIGHT SOURCE ILLUMINATING A ROOM SHARED BY TWO USERS WEARING SHUTTER GLASSES SYNCHRONIZED WITH THE LIGHT SOURCE

TECHNICAL FIELD

The present application relates generally to a periodic light source actuation directive for a light source and a shutter control directive for a new eye apparatus.

BACKGROUND

In many circumstances, a plurality of individuals may utilize portions of a common space, such as a room, a study, a library, and/or the like. Each individual of the plurality of individuals may be engaged in various activities, such as reading a book, watching a movie, and/or the like. In such circumstances, it may be desirable to allow each individual to engage in their respective activity in a manner that is pleasing to the individual, in a manner that enhances the activity, and/or the like.

SUMMARY

Various aspects of examples of the invention are set out in the claims.

One or more embodiments may provide an apparatus, a computer readable medium, a non-transitory computer readable medium, a computer program product, and a method for receiving information indicative of a first light preference profile, the first light preference profile being associated with a first user of a first near eye apparatus, receiving information indicative of a second light preference profile, the second light preference profile being associated with a second user of a second near eye apparatus, determining that the first light preference profile differs from the second light preference profile, determining, in response to the determination that the first light preference profile differs from the second light preference profile, a first light control setting based, at least in part, on the first light preference profile, determining, in response to the determination that the first light preference profile differs from the second light preference profile, a second light control setting based, at least in part, on the second light preference profile, determining a periodic light source actuation directive that is configured to actuate at least one light source in conformance with the first light control setting for a first time period and to actuate the light source in conformance with the second light control setting for a second time period, causing sending of the periodic light source actuation directive to the light source, determining a first shutter control directive for the first near eye apparatus, the first shutter control directive being configured to cause the first near eye apparatus to be translucent during at least a portion of the first time period and to be opaque during at least a portion of the second time period, causing sending of the first shutter control directive to the first near eye apparatus, determining a second shutter control directive for the second near eye apparatus, the second shutter control directive being configured to cause the second near eye apparatus to be translucent during at least a portion of the second time period and to be opaque during at least a portion of the first time period, and causing sending of the second shutter control directive to the second near eye apparatus.

One or more embodiments may provide an apparatus, a computer readable medium, a computer program product, and a non-transitory computer readable medium having means for receiving information indicative of a first light preference profile, the first light preference profile being associated with a first user of a first near eye apparatus, means for receiving information indicative of a second light preference profile, the second light preference profile being associated with a second user of a second near eye apparatus, means for determining that the first light preference profile differs from the second light preference profile, means for determining, in response to the determination that the first light preference profile differs from the second light preference profile, a first light control setting based, at least in part, on the first light preference profile, means for determining, in response to the determination that the first light preference profile differs from the second light preference profile, a second light control setting based, at least in part, on the second light preference profile, means for determining a periodic light source actuation directive that is configured to actuate at least one light source in conformance with the first light control setting for a first time period and to actuate the light source in conformance with the second light control setting for a second time period, means for causing sending of the periodic light source actuation directive to the light source, means for determining a first shutter control directive for the first near eye apparatus, the first shutter control directive being configured to cause the first near eye apparatus to be translucent during at least a portion of the first time period and to be opaque during at least a portion of the second time period, means for causing sending of the first shutter control directive to the first near eye apparatus, means for determining a second shutter control directive for the second near eye apparatus, the second shutter control directive being configured to cause the second near eye apparatus to be translucent during at least a portion of the second time period and to be opaque during at least a portion of the first time period, and means for causing sending of the second shutter control directive to the second near eye apparatus.

An apparatus comprising at least one processor and at least one memory, the memory comprising machine-readable instructions, that when executed cause the apparatus to perform receipt of information indicative of a first light preference profile, the first light preference profile being associated with a first user of a first near eye apparatus, receipt of information indicative of a second light preference profile, the second light preference profile being associated with a second user of a second near eye apparatus, determination that the first light preference profile differs from the second light preference profile, determination, in response to the determination that the first light preference profile differs from the second light preference profile, of a first light control setting based, at least in part, on the first light preference profile, determination, in response to the determination that the first light preference profile differs from the second light preference profile, of a second light control setting based, at least in part, on the second light preference profile, determination of a periodic light source actuation directive that is configured to actuate at least one light source in conformance with the first light control setting for a first time period and to actuate the light source in conformance with the second light control setting for a second time period, causation of sending of the periodic light source actuation directive to the light source, determination of a first shutter control directive for the first near eye apparatus, the first shutter control directive being configured to cause the first near eye apparatus to be translucent during at least a portion of the first time period and to be opaque during at least a portion of the second time period, causation of sending of the first shutter control directive to the first near eye apparatus, determination of a second shutter control directive for the second near eye apparatus, the second shutter control directive being configured to cause the second near eye apparatus to be translucent during at least a portion of the second time period and to be opaque during at least a portion of the first time period, and causation of sending of the second shutter control directive to the second near eye apparatus.

In at least one example embodiment, a light preference profile comprises information indicative of a lighting scheme preference of a user of a near eye apparatus.

In at least one example embodiment, a light preference profile comprises at least one light preference setting.

In at least one example embodiment, a light preference setting is at least one of a light brightness setting, a light color setting, a light temperature setting, or a light strobe setting.

In at least one example embodiment, a near eye apparatus is an apparatus that is configurable to allow user perception of at least of portion of the environment around the user while the apparatus is translucent, and to preclude user perception of at least a portion of the environment around the user while the apparatus is opaque.

In at least one example embodiment, a user of a near eye apparatus is a wearer of the near eye apparatus.

In at least one example embodiment, a near eye apparatus is at least one of a shutter apparatus, a head mounted shutter apparatus, a pair of shutter glasses, a pair of shutter goggles, or a visor.

In at least one example embodiment, a light control setting is a setting that indicates at least one characteristic of light output of a light source.

In at least one example embodiment, the characteristic of the light output of the light source is at least one of a brightness, a color, or a color temperature.

In at least one example embodiment, a periodic light source actuation directive comprises instructions that cause a light source to be actuated in conformance with a light control setting.

In at least one example embodiment, a periodic light source actuation directive comprises instructions that indicate at least one of a brightness, a color, a color temperature, an actuation duration, a time period, or a duration.

In at least one example embodiment, a periodic light source actuation directive comprises instructions that cause a light source to actuate in conformance with at least one of a brightness, a color, a color temperature, an actuation duration, a time period, or a duration.

In at least one example embodiment, a near eye apparatus comprises at least one lens, the near eye apparatus being translucent refers to the lens of the near eye apparatus being translucent, and the near eye apparatus being opaque refers to the lens of the near eye apparatus being opaque.

In at least one example embodiment, the periodic light source actuation directive is determined such that the second time period begins when the first time period ends.

In at least one example embodiment, the periodic light source actuation directive is determined such that the first time period begins when the second time period ends.

In at least one example embodiment, the periodic light source actuation directive indicates repetition of the first time period and the second time period.

In at least one example embodiment, the first light preference profile comprises at least a first light preference setting, the second light preference profile comprises at least a second light preference setting, and the determination that the first light preference profile differs from the second light preference profile comprises determination that first light preference setting differs from the second light preference setting.

In at least one example embodiment, the first shutter control directive comprises instructions that cause the first near eye apparatus to be opaque at the beginning of the portion of the second time period, such that the first near eye apparatus is caused to be opaque during the portion of the second time period.

In at least one example embodiment, the first shutter control directive comprises instructions that cause the first near eye apparatus to be translucent at the beginning of the portion of the first time period, such that the first near eye apparatus is caused to be translucent during the portion of the first time period.

In at least one example embodiment, the first shutter control directive comprises instructions that cause the first near eye apparatus to be opaque at the beginning of the portion of the second time period and to cause the first near eye apparatus to terminate being opaque at the end of the portion of the second time period, such that the first near eye apparatus is caused to be opaque during the portion of the second time period.

In at least one example embodiment, the first shutter control directive comprises instructions that cause the first near eye apparatus to be translucent at the beginning of the portion of the first time period and to cause the first near eye apparatus to terminate being translucent at the end of the portion of the first time period, such that the first near eye apparatus is caused to be translucent during the portion of the first time period.

In at least one example embodiment, the first shutter control directive comprises instructions that cause the first near eye apparatus to be opaque at the beginning of the portion of the second time period and to remain being opaque for a duration equal to a duration of the portion of the second time period, such that the first near eye apparatus is caused to be opaque during the portion of the second time period.

In at least one example embodiment, the first shutter control directive comprises instructions that cause the first near eye apparatus to be translucent at the beginning of the portion of the first time period and to remain being translucent for a duration equal to a duration of the portion of the first time period, such that the first near eye apparatus is caused to be translucent during the portion of the first time period.

In at least one example embodiment, the second shutter control directive comprises instructions that cause the second near eye apparatus to be translucent at the beginning of the portion of the second time period, such that the second near eye apparatus is caused to be translucent during the portion of the second time period.

In at least one example embodiment, the second shutter control directive comprises instructions that cause the second near eye apparatus to be opaque at the beginning of the portion of the first time period, such that the second near eye apparatus is caused to be opaque during the portion of the first time period.

In at least one example embodiment, the second shutter control directive comprises instructions that cause the second near eye apparatus to be translucent at the beginning of the portion of the second time period and to cause the second near eye apparatus to terminate being translucent at the end of the portion of the second time period, such that the second near eye apparatus is caused to be translucent during the portion of the second time period.

In at least one example embodiment, the second shutter control directive comprises instructions that cause the second near eye apparatus to be opaque at the beginning of the portion of the first time period and to cause the second near eye apparatus to terminate being opaque at the end of the portion of the first time period, such that the second near eye apparatus is caused to be opaque during the portion of the first time period.

In at least one example embodiment, the second shutter control directive comprises instructions that cause the second near eye apparatus to be translucent at the beginning of the portion of the second time period and to remain being translucent for a duration equal to a duration of the portion of the second time period, such that the second near eye apparatus is caused to be translucent during the portion of the second time period.

In at least one example embodiment, the second shutter control directive comprises instructions that cause the second near eye apparatus to be opaque at the beginning of the portion of the first time period and to remain being opaque for a duration equal to a duration of the portion of the first time period, such that the second near eye apparatus is caused to be opaque during the portion of the first time period.

One or more example embodiments further perform receipt of information indicative of a separate light adjustment apparatus input from a separate light adjustment apparatus, the separate light adjustment apparatus input indicating a user directive to change at least one light preference setting of at least one of the first light preference profile or the second light preference profile, receipt of information indicative of a near eye apparatus input from the first near eye apparatus, and causation of modification of at least one light preference setting of the first light preference profile based, at least in part, on the separate light adjustment apparatus input and the near eye apparatus input being received from the first near eye apparatus.

One or more example embodiments further perform receipt of a profile change directive associated with the first light preference profile, and causation of changing of the first light preference profile in conformance with the profile change directive.

In at least one example embodiment, the profile change directive is a profile selection directive that designates a third light preference profile.

One or more example embodiments further perform determination, in response to the causation of the changing of the first light preference profile in conformance with the profile change directive, of a changed first light control setting based, at least in part, on the changed first light preference profile, determination of a changed periodic light source actuation directive that is configured to actuate at least one light source in conformance with the changed first light control setting for the first time period and to actuate the light source in conformance with the second light control setting for the second time period, causation of sending of the changed periodic light source actuation directive to the light source.

One or more example embodiments further perform determination, in response to the causation of the changing of the first light preference profile in conformance with the profile change directive, of a changed first shutter control directive for the first near eye apparatus, the changed first shutter control directive being configured to cause the first near eye apparatus to be translucent during at least a portion of the first time period and to be opaque during at least a portion of the second time period, and causation of sending of the changed first shutter control directive to the first near eye apparatus.

In at least one example embodiment, the profile change directive is a light preference setting change directive that designates a changed first light preference setting of the first light preference profile.

One or more example embodiments further perform determination, in response to the causation of the changing of the first light preference profile in conformance with the profile change directive, of a changed first light control setting based, at least in part, on the changed first light preference setting of the changed first light preference profile, determination of a changed periodic light source actuation directive that is configured to actuate at least one light source in conformance with the changed first light control setting for the first time period and to actuate the light source in conformance with the second light control setting for the second time period, and causation of sending of the changed periodic light source actuation directive to the light source.

In at least one example embodiment, the profile change directive is a light preference profile blend directive that designates the first light preference profile, the second light preference profile, and a light preference profile blend ratio.

One or more example embodiments further perform determination, in response to the causation of the changing of the first light preference profile in conformance with the profile change directive, of a changed first light control setting based, at least in part, on the first light preference profile, the second light preference profile, and the light preference profile blend ratio, determination of a changed periodic light source actuation directive that is configured to actuate at least one light source in conformance with the changed first light control setting for the first time period and to actuate the light source in conformance with the second light control setting for the second time period, and causation of sending of the changed periodic light source actuation directive to the light source.

One or more example embodiments further perform determination, in response to the causation of the changing of the first light preference profile in conformance with the profile change directive, of a changed first shutter control directive for the first near eye apparatus, the changed first shutter control directive being configured to cause the first near eye apparatus to be translucent during at least a portion of the first time period and to be opaque during at least a portion of the second time period, and causation of sending of the changed first shutter control directive to the first near eye apparatus.

One or more example embodiments further perform determination that the changed first light preference profile fails to differ from the second light preference profile, determination of a changed periodic light source actuation directive that is configured to actuate the light source in conformance with the second light control setting for the first time period and the second time period based, at least in part, on the determination that the changed first light preference profile fails to differ from the second light preference profile, and causation of sending of the changed periodic light source actuation directive to the light source.

One or more example embodiments further perform determination of a changed first shutter control directive for the first near eye apparatus, the changed first shutter control directive being configured to cause the first near eye apparatus to be translucent during at least a portion of the first time period and at least a portion of the second time period, and causation of sending of the changed first shutter control directive to the first near eye apparatus.

In at least one example embodiment, the determination of the changed first shutter control directive is performed in response to the determination that the changed first light preference profile fails to differ from the second light preference profile.

In at least one example embodiment, the changed first shutter control directive is configured to preclude opacity of the first near eye apparatus.

One or more example embodiments further perform determination of a changed second shutter control directive for the second near eye apparatus, the changed second shutter control directive being configured to cause the second near eye apparatus to be translucent during at least a portion of the second time period and at least a portion of the first time period, and causation of sending of the changed second shutter control directive to the second near eye apparatus.

In at least one example embodiment, the determination of the changed second shutter control directive is performed in response to the determination that the changed first light preference profile fails to differ from the second light preference profile.

In at least one example embodiment, the changed second shutter control directive is configured to preclude opacity of the second near eye apparatus.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
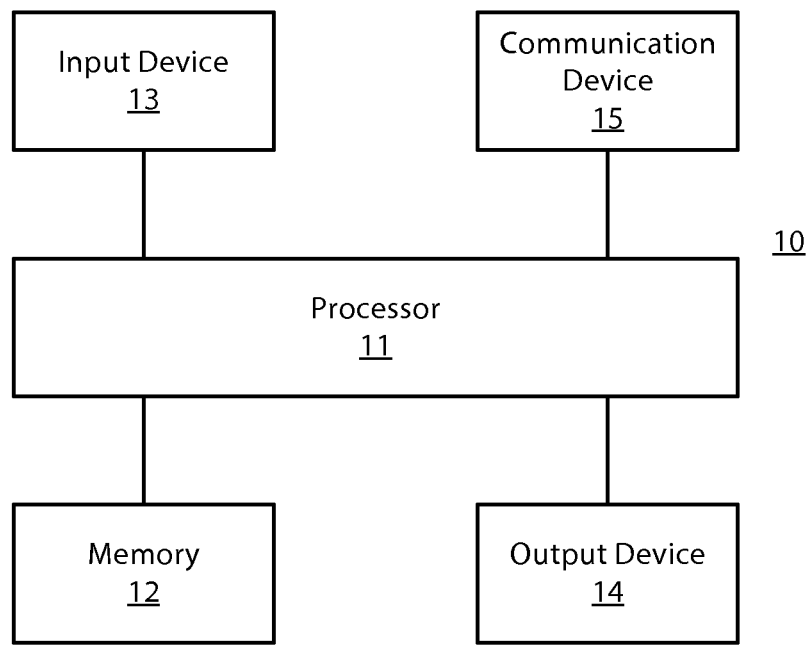
FIG. 1 is a block diagram showing an apparatus according to at least one example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, a light system, a light controller, a light adjustment apparatus, a light source, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
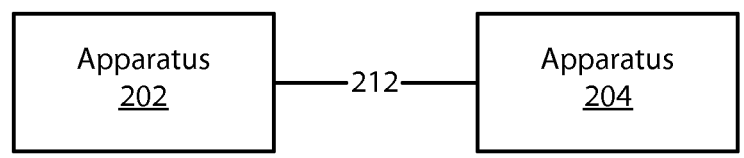
FIG. 2 is a diagram illustrating apparatus communication according to at least one example embodiment.

FIG. 2 is a diagram illustrating apparatus communication according to at least one example embodiment. The example of FIG. 2 is merely an example and does not limit the scope of the claims. For example, apparatus count may vary, apparatus configuration may vary, communication channels may vary, and/or the like.

FIG. 2 is a diagram illustrating apparatus communication according to at least one example embodiment. In the example of FIG. 2, apparatus 202 is an electronic apparatus. An electronic apparatus may be an electronic apparatus that a user commonly utilizes during performance of various tasks, activities, and/or the like. For example, the electronic apparatus may be a near eye apparatus, a pair of shutter glasses, a pair of shutter goggles, a visor apparatus, a light adjustment apparatus, a phone, a tablet, a computer, a laptop, and/or the like. In the example of FIG. 2, apparatus 204 is a separate electronic apparatus. A separate electronic apparatus may be an electronic apparatus that a user often utilizes in conjunction with the electronic apparatus, in proximity to the electronic apparatus, and/or the like. For example, a separate electronic apparatus may be a lighting system, a light source, a light controller, a light adjustment apparatus, a phone, a tablet, a computer, a laptop, and/or the like. Although the aforementioned example describes apparatus 202 and apparatus 204 as distinct types of apparatuses, namely, an electronic apparatus and a separate electronic apparatus, in some circumstances, the apparatuses may both be electronic apparatuses, both be separate electronic apparatuses, and/or the like.

In the example of FIG. 2, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2 illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, an apparatus may be a phone, a tablet, a computer, a display, a monitor, a head mounted display, a see through display, a wearable apparatus, a head worn apparatus, a hand worn apparatus, an electronic apparatus, a peripheral apparatus, a host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 202 communicates with apparatus 204 by way of communication channel 212. In the example of FIG. 2, communication channel 212 may be a local area network communication channel, a wide area network communication channel, an internet communication channel, a cellular communication channel, and/or the like.

Figure 3:
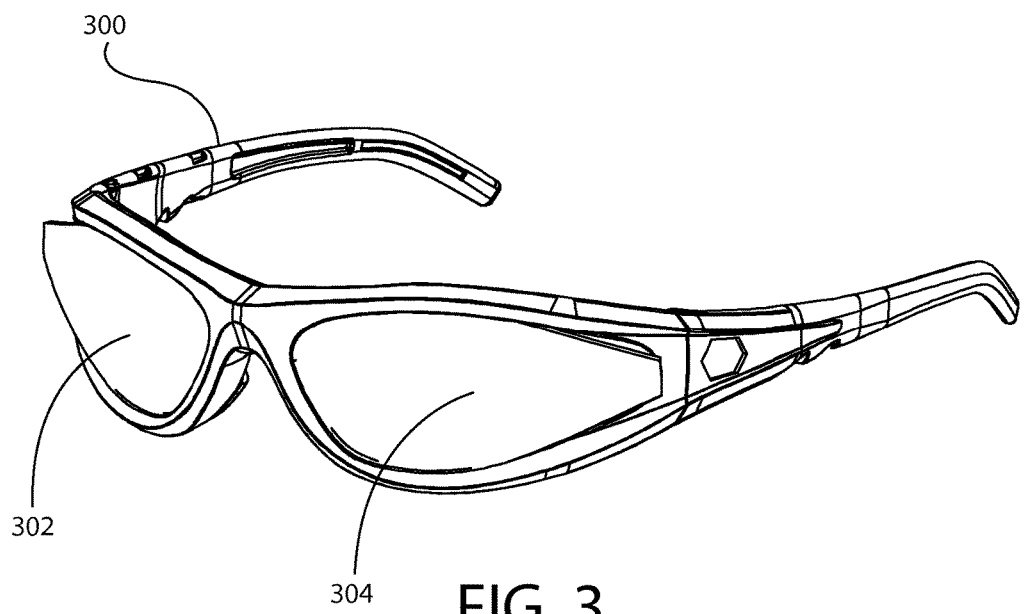
FIG. 3 is a diagram illustrating a near eye apparatus according to at least one example embodiment.

FIG. 3 is a diagram illustrating a near eye apparatus according to at least one example embodiment. The example of FIG. 3 is merely an example and does not limit the scope of the claims. For example, near eye apparatus design may vary, near eye apparatus configuration may vary, lens count and/or configuration may vary, and/or the like.

In recent times, near eye apparatuses, such as shutter glasses, have become widely used in conjunction with liquid crystal displays. For example, a user, or wearer, may wear a near eye apparatus in order to facilitate user perception of three dimensional content that is displayed by way of a liquid crystal display. In such circumstances, the near eye apparatus may facilitate user perception of a different image of each eye such that the user perceives a depth associated with the otherwise two dimensional content. In such circumstances, the near eye apparatus may alternately obscure user perception of the display via the user's right eye and left eye, while the display is caused to display frames that are intended to be perceivable by the user's eye that is not obscured. In at least one example embodiment, a near eye apparatus is an apparatus that is configurable to allow user perception of at least of portion of the environment around the user while the near eye apparatus is translucent, and to preclude user perception of at least a portion of the environment around the user while the near eye apparatus is opaque. A near eye apparatus may be a shutter apparatus, a head mounted shutter apparatus, a pair of shutter glasses, a pair of shutter goggles, a visor, and/or the like.

For example, a near eye apparatus may comprise at least one lens. In such an example, the near eye apparatus being translucent refers to the at least one lens of the near eye apparatus being translucent, and the near eye apparatus being opaque refers to the at least one lens of the near eye apparatus being opaque. In this manner, a user may perceive at least a portion of the environment around the user while the lens is translucent, and the user may fail to perceive at least a portion of the environment around the user while the lens is opaque. It is known that near eye apparatuses may achieve shutter switching rates of over 100 Hz, and with Pi-cell technology, shutter switching rates of 1 kHz are possible. There are many manners in which a near eye apparatus may actuate between being opaque and being translucent, and many additional manners will likely be developed in the future. As such, the manner in which the near eye apparatus actuates between being opaque and being translucent does not limit the scope of the claims.

FIG. 3 is a diagram illustrating a near eye apparatus according to at least one example embodiment. The example of FIG. 3 depicts near eye apparatus 300, which comprises lens 302 and lens 304. As can be seen, in the example of FIG. 3, near eye apparatus 300 is a pair of shutter glasses. In the example of FIG. 3, lens 302 corresponds with a right of a user of near eye apparatus 300 when near eye apparatus 300 is worn by the user. Similarly, in the example of FIG. 3, lens 304 corresponds with a left of a user of near eye apparatus 300 when near eye apparatus 300 is worn by the user. If either or both lenses 302 and 304 are caused to be translucent, a user may perceive at least a portion of the environment surrounding the user through lenses 302 and 304 while either or both lenses 302 and 304 are translucent. If either or both lenses 302 and 304 are caused to be opaque, a user may fail to perceive at least a portion of the environment surrounding the user through lenses 302 and 304 while either or both lenses 302 and 304 are opaque.

In the example of FIG. 3, either or both of lenses 302 and 304 may be caused to rapidly alternate between being opaque and being translucent. For example, as described previously regarding utilization of a near eye apparatus in conjunction with user perception of three dimensional content, lens 302 may rapidly alternate between being opaque and being translucent. Similarly, lens 304 may rapidly alternate between being translucent and being opaque. In this manner, a user of near eye apparatus 300 may perceive at least a portion of the environment surrounding the user by way of one of the user's eyes at a time. Alternatively, lenses 302 and 304 may alternate between being opaque and being translucent in unison. In this manner, the a user of near eye apparatus 300 may perceive at least a portion of the environment surrounding the user by way of both of the user's eyes, but only a portion of the time.

Figure 4:
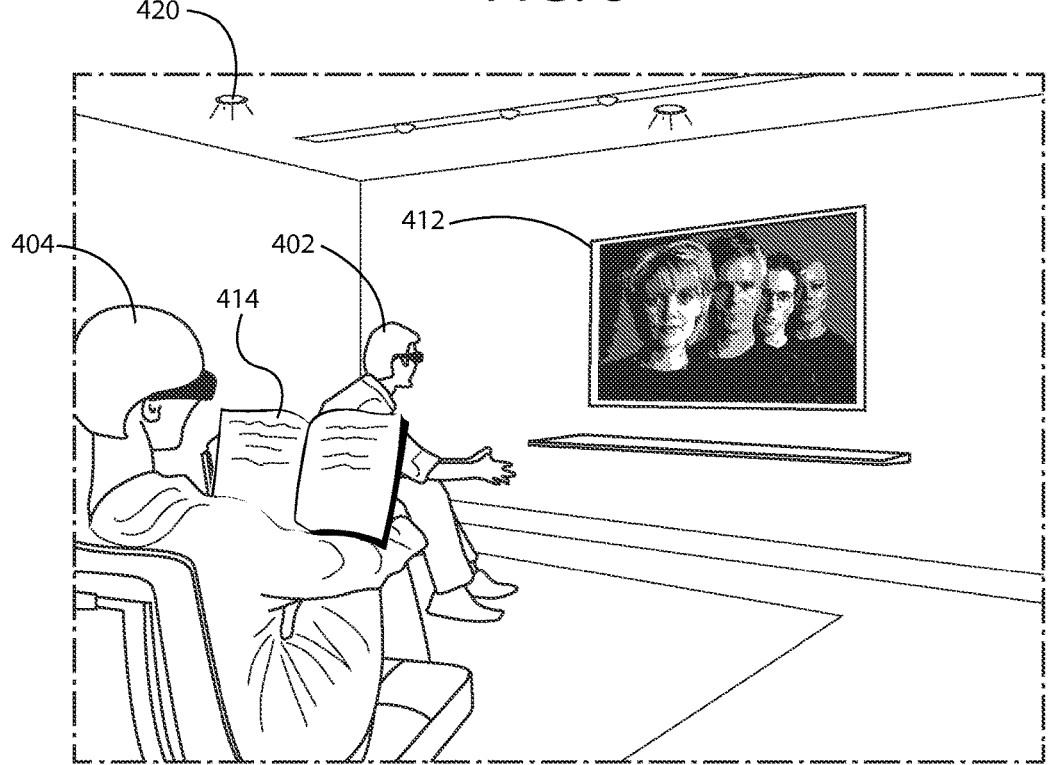
FIG. 4 is a diagram illustrating user utilization of a near eye apparatus according to at least one example embodiment.

FIG. 4 is a diagram illustrating user utilization of a near eye apparatus according to at least one example embodiment. The example of FIG. 4 is merely an example and does not limit the scope of the claims. For example, near eye apparatus configuration may vary, light source configuration may vary, user count may vary, and/or the like.

In many circumstances, a user may desire to perform an activity in a particular space. For example, the user may desire to read a book, watch television, and/or the like. In such circumstances, the user may desire to read a book in a well-lit space, to watch a movie in a dim room, and/or the like. In some circumstances, two users may desire to perform two different activities at two different levels of illumination. For example, two individuals in a single room may desire to adjust the lighting in the room to suit reading a book and watching a movie. In such an example, one individual may be reading a book and may desire to read under a high level of illumination in order to comfortably read the text of the book and avoid eye strain, while the other individual may be viewing a movie and may desire to view under a lower level of illumination in order to allow the display that is displaying the movie to be emphasized against a dim background.

As discussed previously, a near eye apparatus may be utilized to selectively block user perception of at least a portion of the user's environment at particular intervals, for particular durations, and/or the like. As such, it may be desirable to configure an apparatus that may utilize such near eye apparatuses and various light sources in order to facilitate individual control of perceived illumination in a common space, such as the aforementioned living room. For example, different illumination schemes, lighting schemes, and/or the like may be time-multiplexed by an apparatus such that a user may utilize a near eye apparatus to selectively perceive a desired illumination scheme, lighting scheme, and/or the like. In this manner, different users may perceive different levels of illumination, different light colors, different color temperatures, and/or the like based, at least in part, on the individual preferences of the particular user. The time-multiplexing of the various lighting schemes may be similar as described regarding FIGS. 5A-5C. In at least one example embodiment, the apparatus is a lighting controller. A lighting controller may be any electronic apparatus that is configurable to selectively cause actuation of at least one light source and at least one near eye apparatus, similar as described regarding the FIGS. 5A-5C.

FIG. 4 is a diagram illustrating user utilization of a near eye apparatus according to at least one example embodiment. The example of FIG. 4 depicts a common space that is occupied by user 402 and user 404. As depicted, the common space is illuminated by various light sources, such as light source 420. As can be seen, user 402 is viewing display 412, and user 404 is reading book 414. As previously described, in circumstances similar to the example of FIG. 4, user 402 may desire to perceive the content displayed on display 412 in dim, warm illumination, and user 404 may desire to read book 414 under bright, cool illumination. In order to facilitate user perception of such lighting schemes, user 402 and user 404 are wearing near eye apparatuses.

Figure 5A:
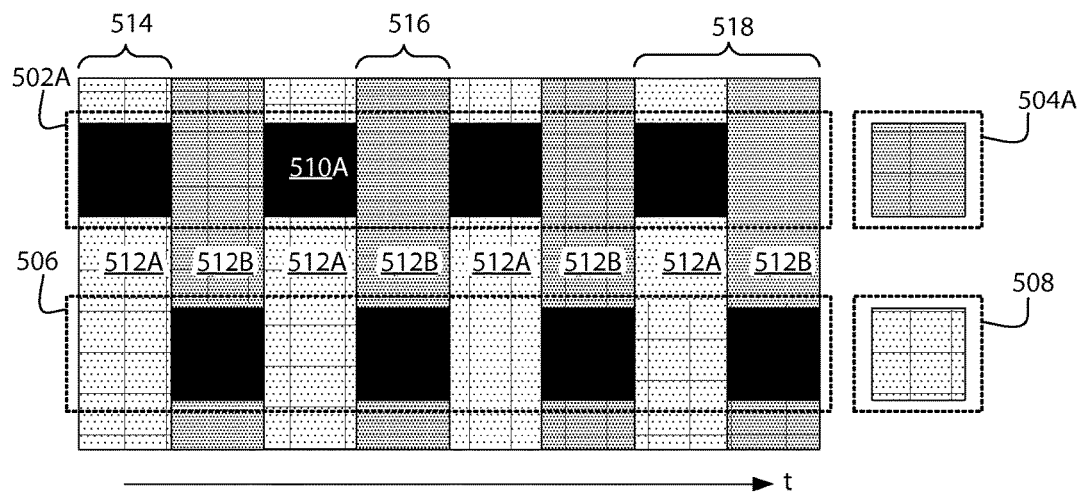
FIGS. 5A-5C are diagrams illustrating light source actuation in relation to shutter control according to at least one example embodiment.
Figure 5B:
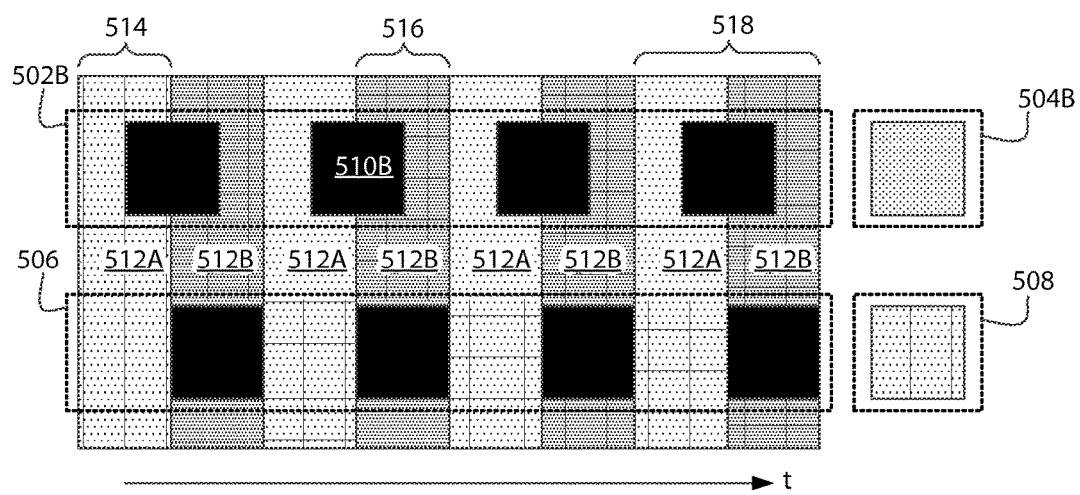
Figure 5C:
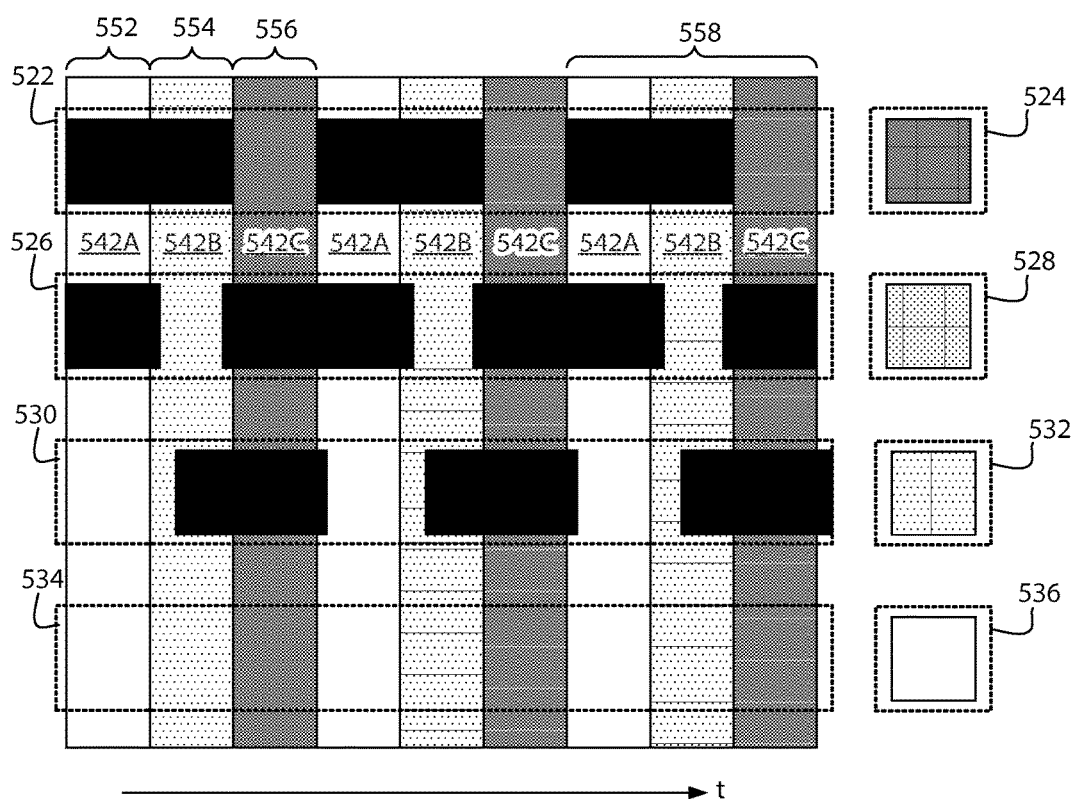

FIGS. 5A-5C are diagrams illustrating light source actuation in relation to shutter control according to at least one example embodiment. The examples of FIGS. 5A-5C are merely examples and do not limit the scope of the claims. For example, user count may vary, near eye apparatus opacity and/or translucency configuration may vary, perceived illumination and/or lighting schemes may vary, time periods may vary, and/or the like.

As described previously, an apparatus, such as a lighting controller, may be utilized to selectively control a light source and a near eye apparatus in order to facilitate user perception of a particular level of illumination, a specific lighting scheme, and/or the like. In order to facilitate such actions, it may be desirable to receive information that indicates a user-desired level of illumination, lighting scheme, and/or the like. In at least one example embodiment, an apparatus receives information indicative of a light preference profile. The light preference profile may be, for example, associated with a user of a near eye apparatus. In such an example embodiment, the light preference profile may comprise information indicative of a lighting scheme preference of a user of a near eye apparatus. For example, the light preference profile may comprise one or more light preference settings, such as a brightness setting, a color setting, a temperature setting, a strobe setting, a dimness setting, and/or the like. In such an example embodiment, the apparatus may receive information indicative of such a light preference profile from each user of a plurality of users that are utilizing a commonly shared space and are utilizing near eye apparatuses to facilitate perception of a particular level of illumination, a specific lighting scheme, and/or the like. For example, the apparatus may receive information indicative of a first light preference profile associated with a first user of a first near eye apparatus, and receive information indicative of a second light preference profile associated with a second user of a second near eye apparatus.

In such an example, if both the first user and the second user desire an identical level of illumination, prefer the same lighting scheme, and/or the like, the users may simply adjust one or more light sources within the shared space as desired. However, it the first user desires a particular lighting scheme and the second user desires a different lighting scheme, it may be necessary to selectively cause actuation of the first user's near eye apparatus, the second user's near eye apparatus, one or more light sources, and/or the like. In at least one example embodiment, an apparatus determines that a light preference profile differs from another light preference profile. For example, a first user may indicate a first light preference profile, and a second user may indicate a second light preference profile. In such an example, the first light preference profile may comprise a first light preference setting, and the second light preference profile may comprise a second light preference setting. In such an example, the determination that the first light preference profile differs from the second light preference profile may comprise determination that first light preference setting differs from the second light preference setting. For example, the first light preference setting may indicate a desired level of illumination of 80 lux, and the second light preference setting may indicate a desire level of illumination of 500 lux. In such an example, the value of the first light preference setting differs from the value of the second light preference setting.

In some circumstances, it may be desirable to produce a particular user-desired lighting scheme by way of control of one or more light sources in a particular room. For example, if a user desires bright illumination, it may be desirable to cause actuation of a light source such that the light source produces a high level of lumen output. In another example, the light source may comprise an array of multicolor light emitting diodes, and may be caused to selectively produce light of a particular color, produce light that comprises a particular selection of wavelengths of light, and/or the like. As such, it may be desirable to determine a light control setting that will facilitate user perception of the user's desired lighting scheme. In at least one example embodiment, an apparatus determines a light control setting based, at least in part, on the light preference profile. Such determination of the light control setting may be in response to the determination that the light preference profile differs from another light preference profile. The light control setting may be a setting that indicates at least one characteristic of light output of a light source, such as brightness, a color, a color temperature, actuation interval, and/or the like. In such an example embodiment, the apparatus may determine a light control setting for each user of a plurality of users that are utilizing a commonly shared space and are utilizing near eye apparatuses to facilitate perception of a particular level of illumination, a specific lighting scheme, and/or the like. For example, the apparatus may determine a first light control setting based, at least in part, on a first light preference profile, and may determine a second light control setting based, at least in part, on a second light preference profile.

In order to facilitate the aforementioned actuation of a particular light source or plurality of light sources, it may be desirable to determine a directive that is configured to selectively cause actuation of the light source such that the light source produces light that conforms to a particular light preference profile, a user-desired lighting scheme, and/or the like. In at least one example embodiment, an apparatus determines a periodic light source actuation directive. In such an example embodiment, the periodic light source actuation directive may be configured to actuate at least one light source in conformance with a light control setting. As discussed previously regarding the facilitation of user perception of differing lighting schemes, it may be desirable to time-multiplex actuation of the light source such that a user wearing a near eye apparatus may selectively perceive the lighting scheme desired by the user, and another user wearing another near eye apparatus may selectively perceive the different lighting scheme desired by the other user. As such, the periodic light source actuation directive may be configured to actuate at least one light source in conformance with a light control setting and a different light control setting. For example, the periodic light source actuation directive may be configured to actuate at least one light source in conformance with a first light control setting for a first time period and to actuate the light source in conformance with the second light control setting for a second time period. In at least one example embodiment, a periodic light source actuation directive comprises instructions that cause a light source to be actuated in conformance with a light control setting. For example, the periodic light source actuation directive may comprise instructions that indicate a brightness, a color, a color temperature, an actuation duration, a time period, and/or the like. In this manner, the periodic light source actuation directive may comprise instructions that cause a light source to be actuated in conformance with the brightness, the color, the color temperature, the actuation duration, the time period, and/or the like.

In the aforementioned example, the first time period and the second time period may be of any duration that is under a user-perceivable duration threshold. For example, if a light source in a room is caused to alternate between producing light of two different colors at a rate of 1 Hz, a user in the room may perceive a strobe effect, may perceive each individual color of light, and/or the like. However, if the light source is caused to alternate between producing light of two different colors at a rate of 120 Hz, the user may perceive a uniform color of light, may be unable to perceive two distinct colors of light, and/or the like. As such, for a light source refresh rate of 1 kHz, the time period may be 1 ms, for a light source refresh rate of 100 Hz, the time period may be 10 ms, and/or the like. In such an example, the light source refresh rate may be a rate at which a light source may be actuated in conformance with a first light control setting and, subsequently, with a second light control setting. For example, a particular light source may be configurable to produce light of varying brightness at a rate of 100 Hz. The periodic light source actuation directive may be determined such that a particular time period begins when the previous time period ends. In such an example, the periodic light source actuation directive may indicate repetition of a particular set of time periods. For example, the periodic light source actuation directive may indicate that a first time period begins when a second time period ends, that the second time period begins when the first time period ends, and/or the like, such that the periodic light source actuation directive indicates repetition of the first time period and the second time period. In this manner, the light source may be caused to produce light of a certain color for the first time period, and produce light of a different color for the second time period. Similarly, the light source may be caused to produce a particular lumen output for the first time period, and produce a different lumen output for the second time period. In such examples, the light source may be caused to rapidly alternate in conformance with the two distinct light control settings.

In order to facilitate such actuation of a light source in conformance with a particular light control setting, it may be desirable to communicate such a periodic light source actuation directive, to send information indicative of the periodic light source actuation directive to the light source, and/or the like. In at least one example embodiment, an apparatus causes sending of the periodic light source actuation directive to the light source. For example, the apparatus may selectively provide electricity, voltage, amperage, wattage, and/or the like to the light source such that the light source is caused to be actuated in conformance with a particular light control setting. In another example, the apparatus may send the periodic light source actuation directive to the light source such that the light source actuates in conformance with the periodic light source actuation directive, one or more light control settings, and/or the like.

In such circumstances, the various light preference profiles may be time-multiplexed by the apparatus, such as a lighting controller. The apparatus may, for example, cause sending of synchronization signals to light source drivers, such as a light emitting diode driver, to drive the various light sources, and may cause sending of the synchronization signals to pulse-width modulation signal generator components to drive the various near eye apparatuses. In this manner, the lighting controller may cause actuation of the various light sources and near eye apparatuses in a synchronous manner.

In implementation, these driver components may be implemented as parts of each light source and near eye apparatus, may be implemented as a centralized lighting controller, and/or the like.

FIG. 5A is a diagram illustrating light source actuation in relation to shutter control according to at least one example embodiment. The example of FIG. 5A depicts a representation of a light source being actuated in conformance with at least two light control settings over a period of time. As can be seen, one or more light sources may be caused to produce lighting scheme 512A and lighting scheme 512B. In the example of FIG. 5A, lighting scheme 512A is a bright lighting scheme, and lighting scheme 512B is a dim lighting scheme. For example, a user reading a book may prefer to read the book under lighting conditions similar to lighting scheme 512A, and a user watching a movie may prefer to watch the movie under lighting conditions similar to lighting scheme 512B. As can be seen, the light source alternates between lighting scheme 512A and lighting scheme 512B, such that lighting scheme 512A is produced for time period 514, and lighting scheme 512B is produced for time period 516.

As discussed previously, a near eye apparatus may be utilized to facilitate user perception of a particular lighting scheme, a particular level of illumination, and/or the like. As such, it may be desirable to cause actuation of the near eye apparatus such that a user wearing the near eye apparatus may selectively perceive only the portion of light produced by one or more light sources that the user desires to perceive. For example, if the user desires to perceive lighting scheme 512A and another user in the same room desires to perceive lighting scheme 512B, it may be desirable to selectively cause actuation of the user's near eye apparatus such that the user perceives only lighting scheme 512A, and to selectively cause actuation of the other user's near eye apparatus such that the other user perceives only lighting scheme 512B. In at least one example embodiment, an apparatus determines a shutter control directive for a near eye apparatus. For example, an apparatus, such as a lighting controller, may cause at least one light source to produce a particular lighting scheme for a first time period, and to produce a different lighting scheme for a second time period. In such an example, the shutter control directive may be configured to cause the near eye apparatus to be translucent during at least a portion of a first time period and to be opaque during at least a portion of a second time period, to be opaque during at least a portion of a first time period and to be translucent during at least a portion of a second time period, and/or the like.

In at least one example embodiment, a shutter control directive indicates initiation of opacity, initiation of translucency, and/or the like. For example, the shutter control directive may comprise instructions that cause the near eye apparatus to be opaque at the beginning of a portion of a time period such that the near eye apparatus is caused to be opaque during the portion of the time period, instructions that cause the near eye apparatus to be translucent at the beginning of the portion of a time period such that the near eye apparatus is caused to be translucent during the portion of the time period, and/or the like. For example, a near eye apparatus may default to a translucent state and may be caused to transition to an opaque state by way of application of voltage across a lens of the near eye apparatus. In such an example, the shutter control directive may indicate a time at which voltage should be applied, and a time at which a different voltage should be applied.

In another example, a shutter control directive may indicate initiation and termination of opacity and/or translucency. For example, the shutter control directive may comprise instructions that cause the near eye apparatus to be opaque at the beginning of a portion of a time period and to cause the near eye apparatus to terminate being opaque at the end of the portion of the time period such that the near eye apparatus is caused to be opaque during the portion of the time period, instructions that cause the near eye apparatus to be translucent at the beginning of a portion of a time period and to cause the near eye apparatus to terminate being translucent at the end of the portion of the time period such that the near eye apparatus is caused to be translucent during the portion of the time period, and/or the like. In this manner, the shutter control directive may cause actuation of the near eye apparatus between a particular state, such as opaque or translucent, and the opposite state. For example, a near eye apparatus may default to a translucent state and may be caused to transition to an opaque state by way of application of voltage across a lens of the near eye apparatus. In such an example, the shutter control directive may indicate a time at which voltage should be applied, and a time at which voltage should no longer be applied.

In at least one example embodiment, a shutter control directive indicates initiation of opacity, initiation of translucency, and/or the like, and a duration associated with such opacity, such translucency, and/or the like. For example, the shutter control directive may comprise instructions that cause the near eye apparatus to be opaque at the beginning of a portion of a time period and to remain being opaque for a duration equal to a duration of the portion of the time period such that the first near eye apparatus is caused to be opaque during the portion of the time period, instructions that cause the near eye apparatus to be translucent at the beginning of a portion of a time period and to remain being translucent for a duration equal to a duration of the portion of the time period, such that the near eye apparatus is caused to be translucent during the portion of the time period, and/or the like. In this manner, the shutter control directive may cause actuation of the near eye apparatus between a particular state, such as opaque or translucent, and the opposite state. For example, a near eye apparatus may default to a translucent state and may be caused to transition to an opaque state by way of application of voltage across a lens of the near eye apparatus. In such an example, the shutter control directive may indicate a time at which voltage should be applied, and a duration for which the voltage should be applied.

In order to facilitate such actuation of a near eye apparatus in conformance with a particular shutter control directive, it may be desirable to communicate such a shutter control directive to the near eye apparatus, to send information indicative of the shutter control directive to the near eye apparatus, and/or the like. In at least one example embodiment, an apparatus causes sending of the shutter control directive to the near eye apparatus. For example, the apparatus may send the shutter control directive to the near eye apparatus such that the near eye apparatus may be caused to selectively provide electricity, voltage, amperage, wattage, and/or the like across a shutter such that the near eye apparatus is caused to be actuated in conformance with the shutter control directive. In some circumstances, two users may utilize near eye apparatuses in a particular room. For example, a first user may be wearing a first near eye apparatus, and a second user may be wearing a second near eye apparatus. In such an example, the apparatus may determine a first shutter control directive for the first near eye apparatus and cause sending of the first shutter control directive to the first near eye apparatus, and may determine a second shutter control directive for the second near eye apparatus and cause sending of the second shutter control directive to the second near eye apparatus.

The example of FIG. 5A, illustrates a representation of shutter actuation arrangement 502A and shutter actuation arrangement 506. In the example of FIG. 5A, each black segment within the boundaries of shutter actuation arrangement 502A and shutter actuation arrangement 506 represents actuation of a near eye apparatus such that the near eye apparatus is opaque. For example, during shutter actuation 510A, at least a portion of lighting scheme 512A is obscured from the view of a user wearing the corresponding near eye apparatus. As can be seen, in shutter actuation arrangement 502A, the shutter is actuated such that the near eye apparatus is opaque during the time periods associated with lighting scheme 512A, and is translucent during the time periods associated with lighting scheme 512B. In this manner, a user wearing the near eye apparatus that is caused to be actuated as represented by shutter actuation arrangement 502A may perceive a lighting scheme indicated by user perceived lighting scheme 504A. As can be seen, user perceived lighting scheme 504A corresponds with lighting scheme 512B. In the example of FIG. 5A, shutter actuation arrangement 506 represents actuation of a shutter such that a near eye apparatus is translucent during the time periods associated with lighting scheme 512A, and is opaque during the time periods associated with lighting scheme 512B. In this manner, a user wearing the near eye apparatus that is caused to be actuated as represented by shutter actuation arrangement 506 may perceive a lighting scheme indicated by user perceived lighting scheme 508. As can be seen, user perceived lighting scheme 508 corresponds with lighting scheme 512A.

In some circumstances, it may be desirable to configure a shutter control directive for a near eye apparatus such that at least a portion of two different lighting schemes are perceivable by a user that is wearing the near eye apparatus. For example, the user may desire to perceive a lighting scheme that is a blend of two different lighting schemes caused to be produced by one or more light sources. For example, a medium brightness lighting scheme may be attained by causing a near eye apparatus to be translucent during production of at least a portion of a high brightness lighting scheme and during production of at least a portion of a low brightness lighting scheme. Similarly, a user may perceive light that is a blend of two distinctly-produced colors of light by allowing user perception of both distinct colors of light in a quickly alternating manner.

FIG. 5B is a diagram illustrating light source actuation in relation to shutter control according to at least one example embodiment. The example of FIG. 5B depicts a representation of a light source being actuated in conformance with at least two light control settings over a period of time, similar as described regarding the example of FIGURE A. As can be seen, the shutter actuations of shutter actuation arrangement 502B have been shifted such that the near eye apparatus being actuation in conformance with shutter actuation arrangement 502B is caused to be opaque during a portion of each time period associated with lighting scheme 512A and lighting scheme 512B. As can be seen, shutter actuation 510B is representative of the near eye apparatus being opaque during a portion of lighting scheme 512A and a portion of lighting scheme 512B. In this manner, a user wearing the near eye apparatus that is caused to be actuated as represented by shutter actuation arrangement 502B may perceive a lighting scheme indicated by user perceived lighting scheme 504B. As can be seen, user perceived lighting scheme 504B corresponds with a blend of lighting scheme 512A and lighting scheme 512B, and is brighter than user perceived lighting scheme 504A of FIG. 5A.

It is important to note that any number of users may be present in a particular shared space, including individuals without a near eye apparatus. The example of FIG. 5C is a diagram illustrating light source actuation in relation to shutter control according to at least one example embodiment. The example of FIG. 5C depicts a representation of a light source being actuated in conformance with at least three light control settings over a period of time. As can be seen, one or more light sources may be caused to produce lighting scheme 542A, lighting scheme 542B, and lighting scheme 542C. In the example of FIG. 5C, lighting scheme 542A is a bright lighting scheme, lighting scheme 542B is a dim lighting scheme, and lighting scheme 542C is a dark lighting scheme.

For example, a user cleaning a table may prefer to clean the table under lighting conditions similar to lighting scheme 542A, a user reading a book may prefer to read the book under lighting conditions similar to lighting scheme 542B, and a user watching a movie may prefer to watch the movie under lighting conditions similar to lighting scheme 542C. As can be seen, the light source alternates between lighting scheme 542A, lighting scheme 542B, and lighting scheme 542C, such that lighting scheme 542A is produced for time period 552, lighting scheme 542B is produced for time period 554, and lighting scheme 542C is produced for time period 556. As can be seen, the total duration associated with a single actuation of each of lighting schemes 542A, 542B, and 542C is time period 558. In order to avoid user perception of flickering, it may be desirable to ensure that time period 558 is associated with a rate that is faster than a user-perceivable rate of change, such as 30 Hz, 60 Hz, 120 Hz, and/or the like.

The example of FIG. 5C, illustrates a representation of shutter actuation arrangements 522, 526, 530, and 534. In the example of FIG. 5C, each black segment within the boundaries of shutter actuation arrangements 522, 526, 530, and 534 represents actuation of a near eye apparatus such that the near eye apparatus is opaque. As can be seen, in shutter actuation arrangement 522, the shutter is actuated such that the near eye apparatus is opaque during the time periods associated with lighting schemes 542A and 542B, and is translucent during the time periods associated with lighting scheme 542C. In this manner, a user wearing the near eye apparatus that is caused to be actuated as represented by shutter actuation arrangement 522 may perceive a lighting scheme indicated by user perceived lighting scheme 524. As can be seen, user perceived lighting scheme 524 corresponds with lighting scheme 542C. In shutter actuation arrangement 526, the shutter is actuated such that the near eye apparatus is opaque during the time periods associated with lighting schemes 542A, 542C, and a portion of the time periods associated with lighting scheme 542B, and is translucent during a portion of the time periods associated with lighting scheme 542B. In this manner, a user wearing the near eye apparatus that is caused to be actuated as represented by shutter actuation arrangement 526 may perceive a lighting scheme indicated by user perceived lighting scheme 528. As can be seen, user perceived lighting scheme 528 corresponds with a perception that is slightly dimmer than lighting scheme 542B, since a portion of the light of lighting scheme 542B is blocked from user perception by the opaque near eye apparatus. In shutter actuation arrangement 530, the shutter is actuated such that the near eye apparatus is opaque during the time periods associated with lighting scheme 542C, a majority of the time periods associated with lighting scheme 542B, and a portion of the time periods associated with lighting scheme 542A, and is translucent during a majority of the time periods associated with lighting scheme 542A and a portion of the time periods associated with lighting scheme 542B. In this manner, a user wearing the near eye apparatus that is caused to be actuated as represented by shutter actuation arrangement 530 may perceive a lighting scheme indicated by user perceived lighting scheme 532. As can be seen, user perceived lighting scheme 532 corresponds with a perception that is a proportional blend of lighting scheme 542A and lighting scheme 542B, since portions of the light of lighting scheme 542A and lighting scheme 542B are perceivable by the user due to the translucency of the near eye apparatus.

In the example of FIG. 5C, it can be seen that shutter actuation arrangement 534 fails to be associated with any shutter actuations, opacity, and/or the like. As such, shutter actuation arrangement 534 may be associated with a user wearing, but not utilizing, a near eye apparatus, a user failing to wear a near eye apparatus, and/or the like. In this manner, user perceived lighting scheme 536 corresponds with a perception that is a proportional blend of all lighting schemes that are displayed in the specific common space, namely, lighting scheme 542A, lighting scheme 542B, and lighting scheme 542C. As depicted in the example of FIG. 5C, user perceived lighting scheme 536 is brighter than user perceived lighting schemes 524, 528, and 532. In such an example, the lack of shutter actuation allows the user perceiving user perceived lighting scheme 536 to perceive all illumination present in the common space, to perceive the user's surrounding without shutter actuations blocking any portion of the illumination, and/or the like.

FIGS. 6A-6D are diagrams illustrating a light preference user interface according to at least one example embodiment. The examples of FIGS. 6A-6D are merely examples and do not limit the scope of the claims. For example, user interface configuration may vary, representations may vary, light preference settings may vary, and/or the like.

In many circumstances, a user that is utilizing an apparatus, such as a lighting controller, to facilitate perception of a particular lighting scheme may desire to modify the lighting scheme. For example, the user may desire to perceive brighter illumination, may desire to perceive light of a different color temperature, and/or the like. As such, it may be desirable to configure an apparatus such that the apparatus may be responsive to user indications of a desired lighting scheme.

In at least one example embodiment, an apparatus receives a profile change directive associated with selection of a different light preference profile. For example, the profile change directive may be received from a separate apparatus that is associated with the light preference profile, may be received from a near eye apparatus that is caused to be actuated in conformance with at least one light preference setting of the light preference profile, and/or the like. In such an example embodiment, the apparatus may cause changing of the light preference profile in conformance with the profile change directive. For example, the profile change directive may be a profile selection directive that designates a different light preference profile. In such an example, the apparatus may determine a changed light control setting based, at least in part, on the changed light preference profile. Such a determination may be in response to the causation of the changing of the light preference profile in conformance with the profile change directive. In such an example, the apparatus may also determine a changed periodic light source actuation directive that is configured to actuate at least one light source in conformance with the changed light control setting. For example, the light source may initially be caused to actuate in conformance with a first light control setting for a first time period, and a second light control setting for a second time period. In such an example, the changed periodic light source actuation directive may cause the light source to be actuated in conformance with a changed first light control setting for the first time period and to actuate the light source in conformance with the second light control setting for the second time period. In order to effect such a change, the apparatus may cause sending of the changed periodic light source actuation directive to the light source, as described regarding FIG. 2 and FIGS. 5A-5C.

Similarly, it may be desirable to allow for modification of a shutter control directive in response to changing of a light preference profile. In at least one example embodiment, an apparatus determines a changed shutter control directive for a near eye apparatus. In such an example, the determination may be in response to the causation of the changing of the first light preference profile in conformance with the profile change directive. In such an example embodiment, the changed shutter control directive may be configured to cause the near eye apparatus to be translucent during at least a portion of a first time period and to be opaque during at least a portion of a second time period. In order to effect such a change, the apparatus may cause sending of the changed shutter control directive to the near eye apparatus.

Figure 6A:
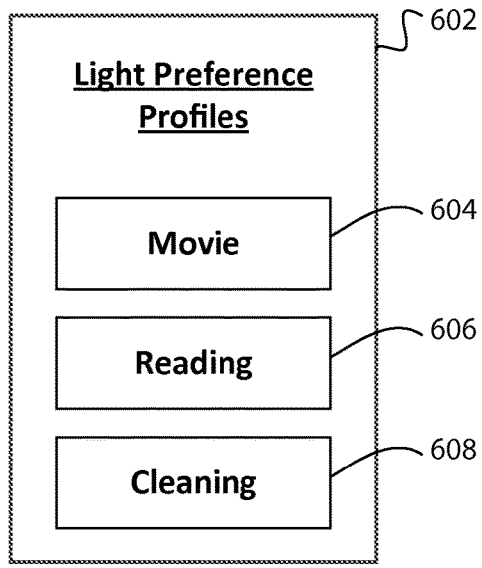
FIGS. 6A-6D are diagrams illustrating a light preference user interface according to at least one example embodiment.

FIG. 6A is a diagram illustrating a light preference profile user interface according to at least one example embodiment. The example of FIG. 6A depicts user interface 602, which comprises light preference profile representations 604, 606, and 608. In the example of FIG. 6A, a user may indicate a desire to perceive a particular lighting scheme indicated by a particular light preference profile by way of the light preference profile representation that corresponds with the particular light preference profile. For example, a user may desire to read a book, may desire to transition from watching a movie to reading a book, and/or the like. In such an example, the user may indicate such a desire by way of an input associated with light preference profile representation 606. In this manner, an apparatus may receive information indicative of a profile change directive associated with selection of a light preference profile, selection of a light preference profile that differs from a current light preference profile, and/or the like.

In some circumstances, a user may wish to modify a light preference profile associated with a currently perceived lighting scheme. In at least one example embodiment, a profile change directive is a light preference setting change directive that designates a changed light preference setting of a light preference profile. For example, an apparatus may determine a changed light control setting based, at least in part, on the changed light preference setting of the changed light preference profile. Such a determination may be in response to the causation of the changing of the first light preference profile in conformance with the profile change directive. For example, the apparatus may initially cause actuation of a light source in conformance with a first light control setting for a first time period, and actuation of the light source in conformance with a second light control setting for a second time period. In such an example, the apparatus may determine a changed periodic light source actuation directive that is configured to actuate the light source in conformance with a changed light control setting for the first time period and to actuate the light source in conformance with the second light control setting for the second time period. In order to effect such a change, the apparatus may cause sending of the changed periodic light source actuation directive to the light source.

Figure 6B:
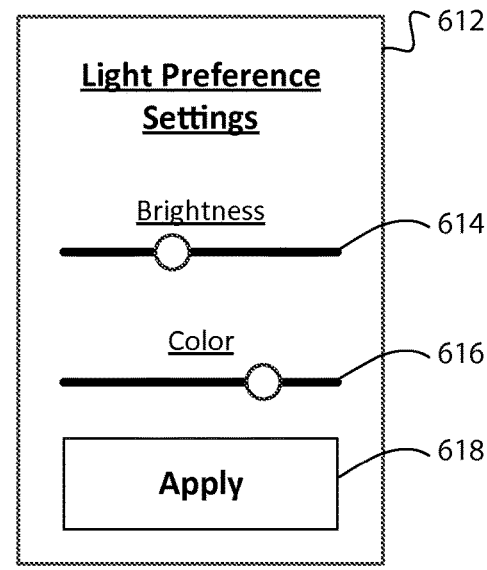

FIG. 6B is a diagram illustrating a light preference setting user interface according to at least one example embodiment. The example of FIG. 6B depicts user interface 612, which comprises light preference setting representations 614 and 616, and light preference setting change implementation representation 618. In the example of FIG. 6B, a user may indicate a desire to cause modification of a particular light preference setting by way of a light preference setting representation that corresponds with the particular light preference setting. For example, a user may desire to read a book, may desire to transition from watching a movie to reading a book, and/or the like. As such, the user may desire to increase the brightness associated with the lighting preference profile. In such an example, the user may indicate such a desire by way of an input associated with light preference setting representation 614. For example, the user may drag the indicator to a position further to the left along light preference setting representation 614. In such an example, the user may cause implementation of such modifications by way of an input associated with light preference setting change implementation representation 618. In this manner, an apparatus may receive information indicative of a profile change directive associated with modification of a light preference setting, a light preference setting change directive, and/or the like.

In some circumstances, a first user and a second user may initially desire to perceive two different lighting schemes and, subsequently, desire to view a common lighting scheme. For example, the first user may desire to perceive the lighting scheme perceived by the second user, the first user may modify a first light preference profile such that the first light preference profile fails to differ from a second light preference profile of the second user, and/or the like. As such, it may be desirable to modify actuation of either or both near eye displays of the first user and the second user, to modify actuation of at least one light source in the room, and/or the like. In at least one example embodiment, an apparatus determines that a changed first light preference profile fails to differ from a second light preference profile. In such an example embodiment, the apparatus may determine a changed periodic light source actuation directive that is configured to actuate the light source in conformance with the second light control setting for the first time period and the second time period. Such a determination may be based, at least in part, on the determination that the changed first light preference profile fails to differ from the second light preference profile. In order to effect such a change, the apparatus may cause sending of the changed periodic light source actuation directive to the light source.

Similarly, the apparatus may cause modification to a shutter control directive. For example, the apparatus may determine a changed first shutter control directive for the first near eye apparatus. In such an example, the changed first shutter control directive may be configured to cause the first near eye apparatus to be translucent during at least a portion of the first time period and at least a portion of the second time period. In such an example embodiment, the determination of the changed first shutter control directive may be performed in response to the determination that the changed first light preference profile fails to differ from the second light preference profile. In such an example embodiment, the changed first shutter control directive may be configured to preclude opacity of the first near eye apparatus. For example, the light control directive may cause the light to be actuated in a single manner for the first time period and the second time period. As such, since the user desires to perceive the lighting scheme associated with the first time period and the second time period, it is not necessary to block user perception of any portion of the lighting scheme produced during the first time period or the second time period. In order to effect such a change, the apparatus may cause sending of the changed first shutter control directive to the first near eye apparatus.

Figure 6C:
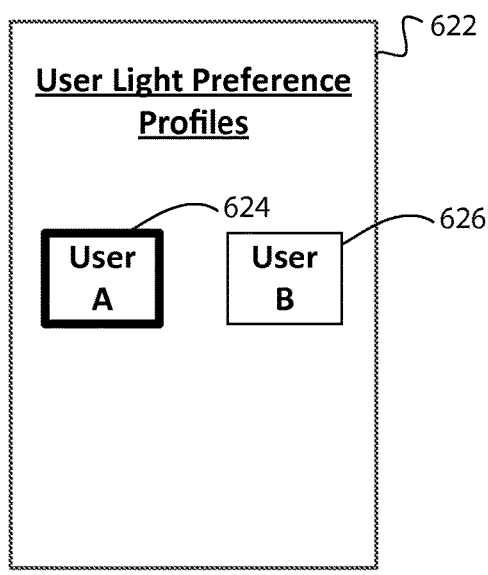

FIG. 6C is a diagram illustrating a light preference user interface according to at least one example embodiment. The example of FIG. 6C depicts user interface 622, which comprises user light preference profile representations 624 and 626. In the example of FIG. 6C, a user may indicate a desire to cause modification of a particular light preference setting by way of a user light preference profile representation that corresponds with the particular user's light preference profile that the user wants to adopt, desires to transition to, desires to perceive, and/or the like. For example, a user may desire to transition to the light preference profile of another user, may desire to join the other user in performance of the other user's activity, and/or the like. As such, the user may desire to adopt the light preference profile of the other user, to transition to the light preference profile of the other user, and/or the like. For example, in FIG. 6C, User A may desire to transition to User B's light preference profile. In such an example, the user may indicate such a desire by way of an input associated with user light preference profile representation 626. In this manner, an apparatus may receive information indicative of a profile change directive associated with adoption of User B's light preference profile, modification of User A's light preference profile in conformance with User B's light preference profile, and/or the like.

In some circumstances, rather than adopting another user's light preference profile, the user may desire to blend the user's light preference profile with the other user's light preference profile. For example, the user may desire to perceive a hint of the color of light perceived by the other user, may desire to view a dimmed perception of holiday lights perceivable by the other user, and/or the like. In at least one example embodiment, a profile change directive is a light preference profile blend directive. Such a light preference profile blend directive may designate a first light preference profile, a second light preference profile, a first light preference profile apportionment, a second light preference profile apportionment, a light preference profile blend ratio, and/or the like. In such an example embodiment, the apparatus may determine a changed light control setting based, at least in part, on the first light preference profile, the second light preference profile, the first light preference profile apportionment, the second light preference profile apportionment, the light preference profile blend ratio, and/or the like. Such a determination may be performed in response to causation of changing of the first light preference profile in conformance with the profile change directive. In such circumstances, it may be desirable to change a periodic light source actuation directive. For example, the apparatus may determine a changed periodic light source actuation directive that is configured to actuate at least one light source in conformance with the changed first light control setting for a first time period and to actuate the light source in conformance with the second light control setting for a second time period. In order to effect such a modification, the apparatus may cause sending of the changed periodic light source actuation directive to the light source.

In such circumstances, it may be desirable to change a shutter control directive in order to facilitate user perception of the blended lighting scheme. In at least one example embodiment, an apparatus determines a changed shutter control directive for a near eye apparatus. Such a determination may be performed in response to the causation of the changing of the first light preference profile in conformance with the profile change directive. In such an example embodiment, the changed shutter control directive may be configured to cause the near eye apparatus to be translucent during at least a portion of a first time period and to be opaque during at least a portion of a second time period. In this manner, a user wearing the near eye apparatus may perceive a portion of the lighting scheme during the first time period and a portion of the different lighting scheme during the second time period such that the user perceives a blended lighting scheme. In order to effect such a modification, the apparatus may cause sending of the changed shutter control directive to the near eye apparatus.

For example, animated lights, such as holiday decorations or disco lights, may be selectively perceivable by a user by way of the time-multiplexing of the lighting schemes, the light sources, and the near eye apparatus. For example, the animation rate of such light sources is often much less than a switching rate associated with the time-multiplexing. Thus, disco lights may still be perceived by a user to be pulsing to the beat, but not perceivable to another user, as long as the disco lights are temporarily turned off while the user's near eye apparatus is caused to be transparent, and turned on while the other user's near eye apparatus is caused to be transparent. Similarly, a near eye apparatus may be used to perceive a specific lighting scheme simultaneously with perception of three dimensional content displayed by way of a display. For example, the shutter control directive may be configured such that a user wearing a near eye display may perceive frames intended for viewing by both the user's right eye and left eye.

Figure 6D:
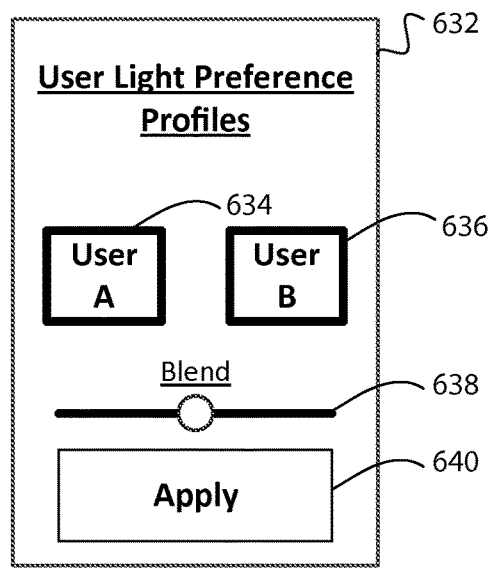

FIG. 6D is a diagram illustrating a user light preference profile blending user interface according to at least one example embodiment. The example of FIG. 6D depicts user interface 632, which comprises user light preference profile representations 634 and 636, user light preference profile blending representation 638, and light preference setting change implementation representation 640. In the example of FIG. 6D, a user may indicate a desire to cause modification of a particular light preference setting by way of a user light preference profile representation that corresponds with the particular user's light preference profile that the user wants to blend with, desires to perceive a hint of, and/or the like. For example, a user may desire to partially transition to the light preference profile of another user, may desire to perceive various light sources perceivable by the other user under the other user's light preference profile, and/or the like. As such, the user may desire to blend with the light preference profile of the other user, to partially transition to the light preference profile of the other user, and/or the like. For example, in FIG. 6D, User A may desire to evenly blend her light preference profile with the light preference profile of User B. In such an example, the user may indicate such a desire by way of an input associated with user light preference profile blending representation 636. In such an example, the user may cause implementation of such modifications by way of an input associated with light preference profile blending implementation representation 640. In this manner, an apparatus may receive information indicative of a profile change directive associated with blending with User B's light preference profile, modification of User A's light preference profile in conformance with User B's light preference profile, and/or the like.

Figure 7A:
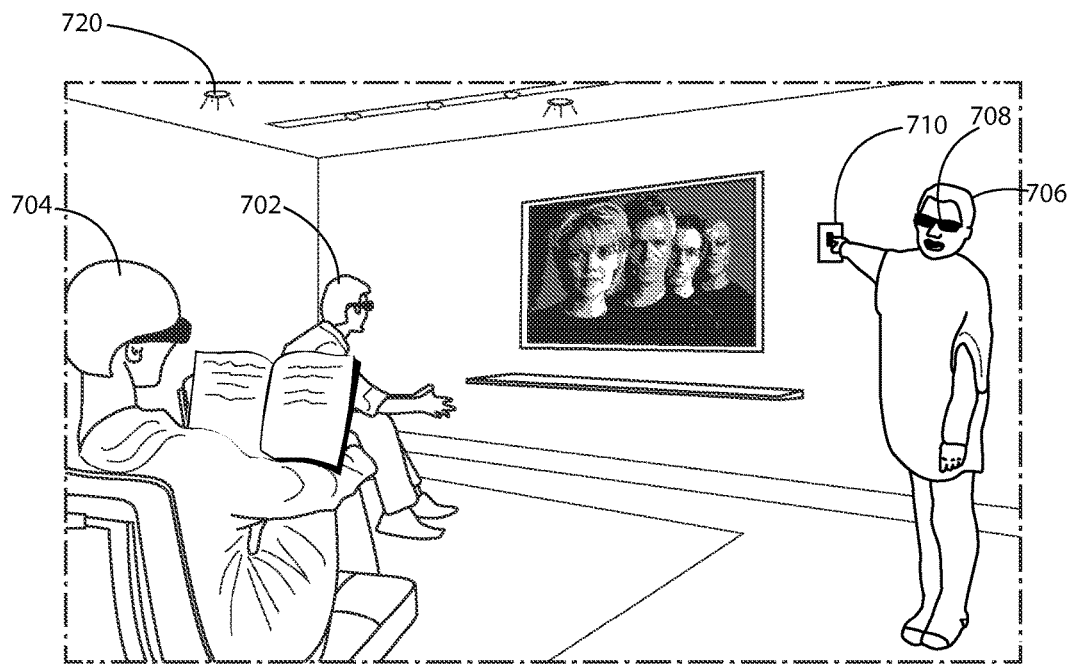
FIGS. 7A-7C are diagrams illustrating user utilization of a separate light adjustment apparatus according to at least one example embodiment.
Figure 7B:
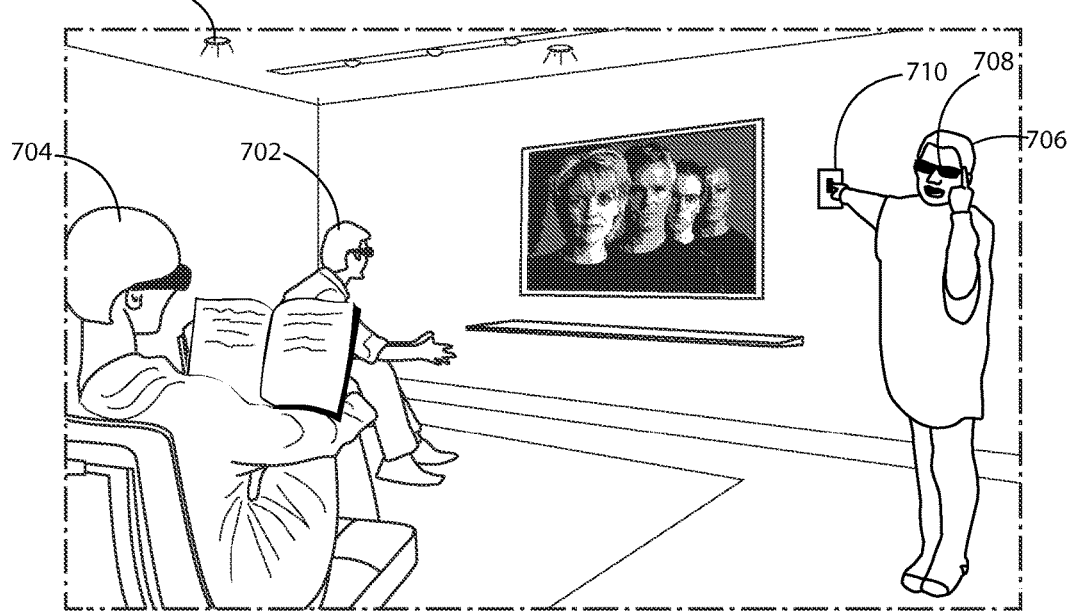
Figure 7C:
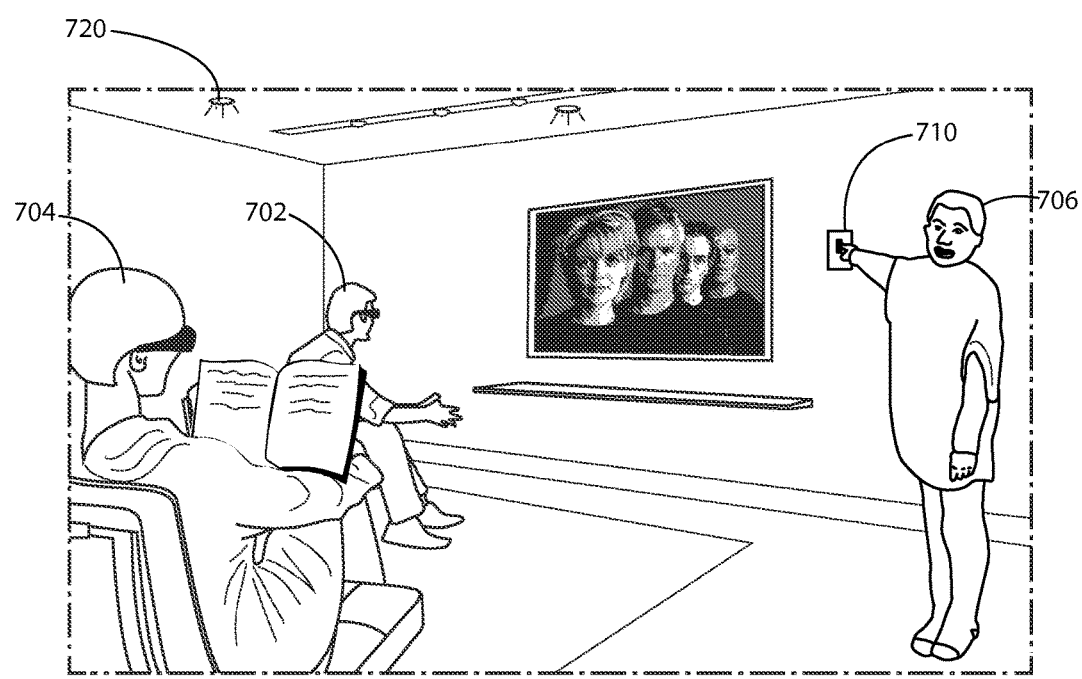

FIGS. 7A-7C are diagrams illustrating user utilization of a separate light adjustment apparatus according to at least one example embodiment. The examples of FIGS. 7A-7C are merely examples and do not limit the scope of the claims. For example, user count may vary, separate light adjustment apparatus configuration may vary, near eye apparatus configuration may vary, and/or the like.

In some circumstances, it may be desirable to allow a user to indicate a desire to cause modification to one or more light preference profiles in a manner intuitive to the user. For example, a user may commonly interact with light sources by way of wall switches. In this manner, the user may be accustomed to utilization of wall switches, light dimmers, and/or the like, to modify a lighting scheme. In at least one example embodiment, an apparatus receives information indicative of a separate light adjustment apparatus input from a separate light adjustment apparatus. In such an example embodiment, the separate light adjustment apparatus input may indicate a user directive to change at least one light preference setting of at least one light preference profile.

In order to identify a particular light preference profile to cause modification to, it may be desirable to receive a user indication of the near eye apparatus that is associated with the particular light preference profile. In at least one example embodiment, an apparatus receives information indicative of a near eye apparatus input from a near eye apparatus. The apparatus may subsequently cause modification to at least one light preference setting of the light preference profile that is associated with the near eye apparatus from which the near eye apparatus input was received. Such a modification may be based, at least in part, on the separate light adjustment apparatus input and the near eye apparatus input being received from the near eye apparatus.

In circumstances in which the apparatus fails to receive a near eye apparatus input that identifies a particular near eye apparatus and/or a particular light preference profile, or in circumstances in which a user failing to wear a near eye apparatus interacts with a separate light adjustment apparatus, it may be desirable to limit the type and/or extent to which the lighting schemes may be modified. For example, the apparatus may preclude modification of a lighting scheme, a light preference profile, a light preference setting, and/or the like, if the apparatus fails to receive a near eye apparatus input from a near eye apparatus. In another example, the apparatus may receive information indicative of a separate light adjustment apparatus input from a separate light adjustment apparatus and may cause modification of the overall lighting scheme in the common space. The overall lighting scheme in the common space may be a lighting scheme visible by a user failing to wear a near eye apparatus. In such an example, the modification of the overall lighting scheme in the common space may be limited to lighting schemes which continue to allow other users in the common space to perceive their desired light preference profiles notwithstanding the modification to the overall lighting scheme. For example, the separate light adjustment apparatus may provide a user with a notification, such as an auditory notification, a visual notification, a tactile notification, and/or the like, indicating that the user is precluded from causing modification to the overall lighting scheme, is precluded from causing further modification to the overall lighting scheme, is precluded from causing modification to another user's light preference profile, and/or the like.

FIG. 7A is a diagram illustrating user utilization of a separate light adjustment apparatus according to at least one example embodiment. The example of FIG. 7A depicts a common space that is occupied by user 702 and user 704. As depicted, the common space is illuminated by various light sources, such as light source 720. As can be seen, user 702 is watching a movie, and user 704 is reading a book. As previously described, in circumstances similar to those depicted in the example of FIG. 7, user 706 may desire to cause modification to the lighting scheme perceived by user 706, perceived by all individuals in the common space, and/or the like. As can be seen, user 706 is wearing near eye apparatus 708, and is interacting with separate light adjustment apparatus 710. As can be seen, user 706 is interacting with separate light adjustment apparatus 710 without indicating a particular light preference profile to modify by way of a near eye apparatus input. As such, the apparatus may receive information indicative of the separate light adjustment apparatus input from separate light adjustment apparatus 710 and may cause modification of the overall lighting scheme in the common space. In such an example, the modification of the overall lighting scheme in the common space may be limited to lighting schemes which continue to allow user 702 and user 704 to perceive their desired light preference profiles notwithstanding the modification to the overall lighting scheme.

FIG. 7B is a diagram illustrating user utilization of a separate light adjustment apparatus according to at least one example embodiment. The example of FIG. 7B depicts a common space that is occupied by users 702, 704, and 706, and separate light adjustment apparatus 710, similar as described regarding the example of FIG. 7A. As can be seen, user 706 is interacting with separate light adjustment apparatus 710 while indicating a particular light preference profile to modify by way of a near eye apparatus input associated with near eye apparatus 708. As such, the apparatus may receive information indicative of the separate light adjustment apparatus input from separate light adjustment apparatus 710 and may cause modification to one or more light profile settings associated with the light preference profile of user 706.

FIG. 7C is a diagram illustrating user utilization of a separate light adjustment apparatus according to at least one example embodiment. The example of FIG. 7C depicts a common space that is occupied by users 702, 704, and 706, and separate light adjustment apparatus 710, similar as described regarding the example of FIG. 7A. As can be seen, user 706 is interacting with separate light adjustment apparatus 710 without wearing a near eye apparatus. As such, the apparatus may receive information indicative of the separate light adjustment apparatus input from separate light adjustment apparatus 710 and may cause modification of the overall lighting scheme in the common space. In such an example, the modification of the overall lighting scheme in the common space may be limited to lighting schemes which continue to allow user 702 and user 704 to perceive their desired light preference profiles notwithstanding the modification to the overall lighting scheme. Alternatively, the apparatus may receive information indicative of the separate light adjustment apparatus input from separate light adjustment apparatus 710 and may preclude modification of the overall lighting scheme in the common space based, at least in part, on user 706 failing to wear a near eye apparatus.

The near eye apparatus implementation discussed herein may be applicable to additional implementations. For example, a shutter similar as comprised by the near eye apparatus may be placed in front of a camera module. In such an example, a user may perceive a specific lighting scheme, lighting that conforms to a particular light preference profile, and/or the like by way of the camera module. For example, the user may utilize a mobile phone comprising a camera module to peek into another user's perceivable lighting scheme. In such an example, while the user is watching a movie, the user may to perceive the lighting scheme that is perceivable by children playing under Christmas lights. In such an example, the user may utilize the mobile phone and the camera module to capture images of the Christmas lights, the children, and/or the like. In another example, a shutter similar as comprised by the near eye apparatus may be placed integrated into windows, doors, and/or the like. As such, outdoor illumination may also be controlled, dimmed, and/or the like.

Figure 8:
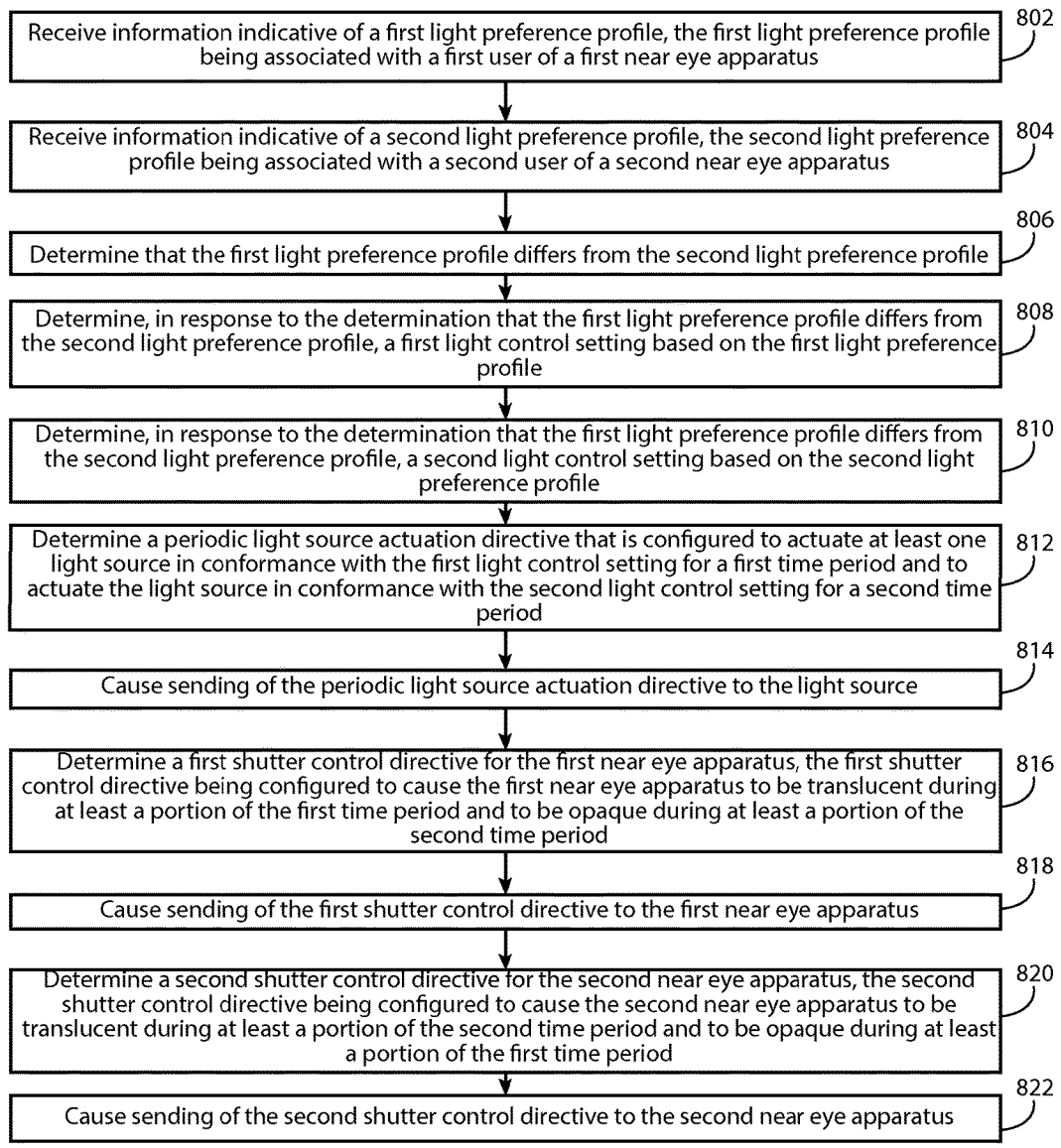
FIG. 8 is a flow diagram illustrating activities associated with determination of a periodic light source actuation directive and determination of a shutter control directive for a near eye apparatus according to at least one example embodiment.

FIG. 8 is a flow diagram illustrating activities associated with determination of a periodic light source actuation directive and determination of a shutter control directive for a near eye apparatus according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives information indicative of a first light preference profile. In at least one example embodiment, the first light preference profile is associated with a first user of a first near eye apparatus. The receipt, the first light preference profile, the first user, and the first near eye apparatus may be similar as described regarding FIG. 2, FIG. 3, FIG. 4, FIGS. 5A-5C, and FIGS. 6A-6D.

At block 804, the apparatus receives information indicative of a second light preference profile. In at least one example embodiment, the second light preference profile is associated with a second user of a second near eye apparatus. The receipt, the second light preference profile, the second user, and the second near eye apparatus may be similar as described regarding FIG. 2, FIG. 3, FIG. 4, FIGS. 5A-5C, and FIGS. 6A-6D.

At block 806, the apparatus determines that the first light preference profile differs from the second light preference profile. The determination may be similar as described regarding FIG. 4, FIGS. 5A-5C, and FIGS. 6A-6D.

At block 808, the apparatus determines a first light control setting based, at least in part, on the first light preference profile. In at least one example embodiment, the determination of the first light control setting is performed in response to the determination that the first light preference profile differs from the second light preference profile. The determination and the first light control setting may be similar as described regarding FIG. 4, FIGS. 5A-5C, and FIGS. 6A-6D.

At block 810, the apparatus determines a second light control setting based, at least in part, on the second light preference profile. In at least one example embodiment, the determination of the second light control setting is performed in response to the determination that the first light preference profile differs from the second light preference profile. The determination and the second light control setting may be similar as described regarding FIG. 4, FIGS. 5A-5C, and FIGS. 6A-6D.

At block 812, the apparatus determines a periodic light source actuation directive that is configured to actuate at least one light source in conformance with the first light control setting for a first time period and to actuate the light source in conformance with the second light control setting for a second time period. The determination, the periodic light source actuation directive, the light source, the actuation of the light source, the first time period, and the second time period may be similar as described regarding FIG. 4, FIGS. 5A-5C, and FIGS. 6A-6D.

At block 814, the apparatus causes sending of the periodic light source actuation directive to the light source. The sending and the causation of sending may be similar as described regarding FIG. 2, FIG. 4, FIGS. 5A-5C, and FIGS. 6A-6D.

At block 816, the apparatus determines a first shutter control directive for the first near eye apparatus. In at least one example embodiment, the first shutter control directive is configured to cause the first near eye apparatus to be translucent during at least a portion of the first time period and to be opaque during at least a portion of the second time period. The determination and the first shutter control directive may be similar as described regarding FIG. 4, FIGS. 5A-5C, and FIGS. 6A-6D.

At block 818, the apparatus causes sending of the first shutter control directive to the first near eye apparatus. The sending and the causation of sending may be similar as described regarding FIG. 2, FIG. 4, FIGS. 5A-5C, and FIGS. 6A-6D.

At block 820, the apparatus determines a second shutter control directive for the second near eye apparatus. In at least one example embodiment, the second shutter control directive is configured to cause the second near eye apparatus to be translucent during at least a portion of the second time period and to be opaque during at least a portion of the first time period. The determination and the second shutter control directive may be similar as described regarding FIG. 4, FIGS. 5A-5C, and FIGS. 6A-6D.

At block 822, the apparatus causes sending of the second shutter control directive to the second near eye apparatus. The sending and the causation of sending may be similar as described regarding FIG. 2, FIG. 4, FIGS. 5A-5C, and FIGS. 6A-6D.

Figure 9:
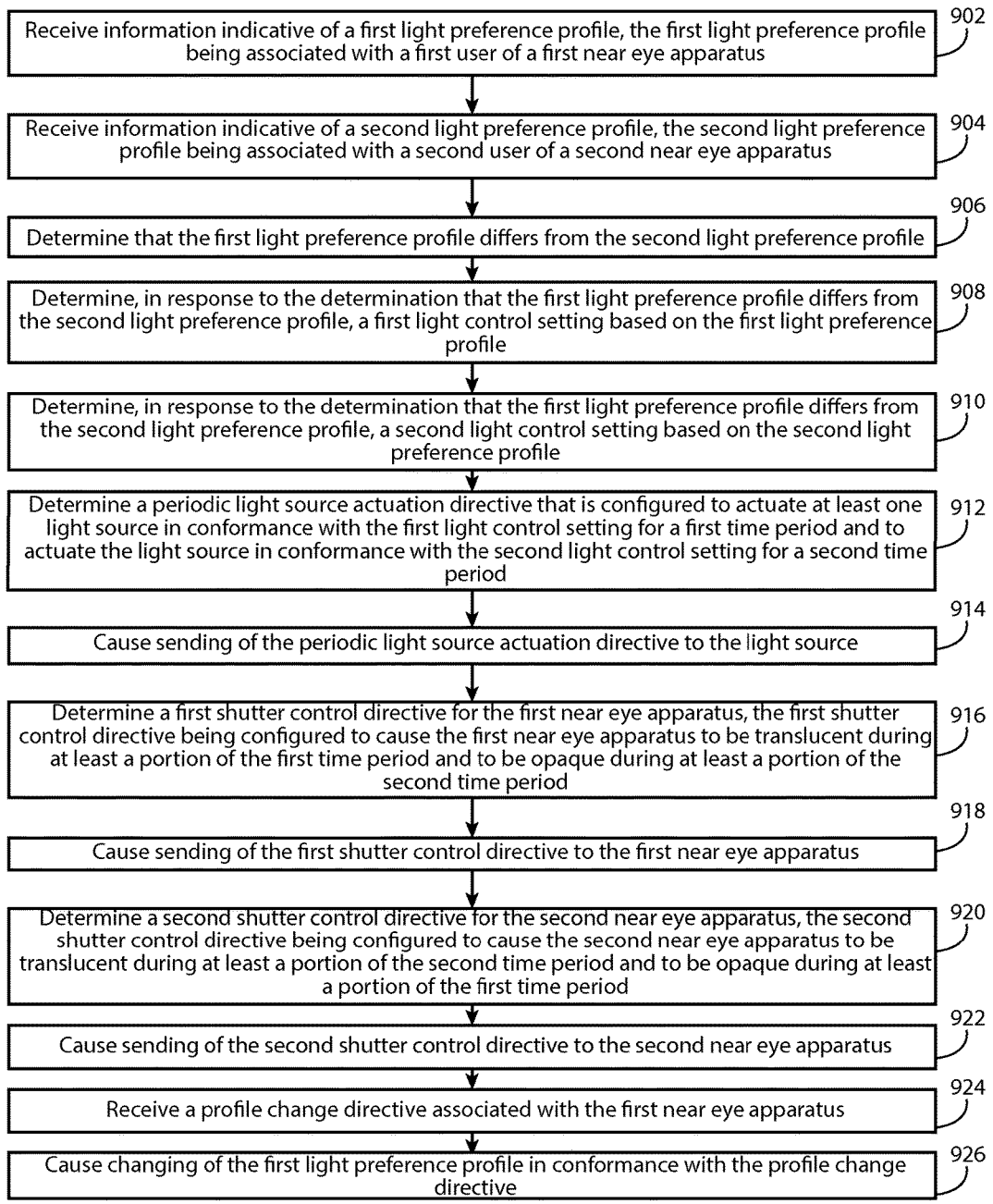
FIG. 9 is a flow diagram illustrating activities associated with receipt of a profile change directive according to at least one example embodiment.

FIG. 9 is a flow diagram illustrating activities associated with receipt of a profile change directive according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, it may be desirable to allow a user to indicate a desire to change a light preference profile and, in response, to cause changing of the light preference profile.

At block 902, the apparatus receives information indicative of a first light preference profile. In at least one example embodiment, the first light preference profile is associated with a first user of a first near eye apparatus. The receipt, the first light preference profile, the first user, and the first near eye apparatus may be similar as described regarding FIG. 2, FIG. 3, FIG. 4, FIGS. 5A-5C, and FIGS. 6A-6D.

At block 904, the apparatus receives information indicative of a second light preference profile. In at least one example embodiment, the second light preference profile is associated with a second user of a second near eye apparatus. The receipt, the second light preference profile, the second user, and the second near eye apparatus may be similar as described regarding FIG. 2, FIG. 3, FIG. 4, FIGS. 5A-5C, and FIGS. 6A-6D.

At block 906, the apparatus determines that the first light preference profile differs from the second light preference profile. The determination may be similar as described regarding FIG. 4, FIGS. 5A-5C, and FIGS. 6A-6D.

At block 908, the apparatus determines a first light control setting based, at least in part, on the first light preference profile. In at least one example embodiment, the determination of the first light control setting is performed in response to the determination that the first light preference profile differs from the second light preference profile. The determination and the first light control setting may be similar as described regarding FIG. 4, FIGS. 5A-5C, and FIGS. 6A-6D.

At block 910, the apparatus determines a second light control setting based, at least in part, on the second light preference profile. In at least one example embodiment, the determination of the second light control setting is performed in response to the determination that the first light preference profile differs from the second light preference profile. The determination and the second light control setting may be similar as described regarding FIG. 4, FIGS. 5A-5C, and FIGS. 6A-6D.

At block 912, the apparatus determines a periodic light source actuation directive that is configured to actuate at least one light source in conformance with the first light control setting for a first time period and to actuate the light source in conformance with the second light control setting for a second time period. The determination, the periodic light source actuation directive, the light source, the actuation of the light source, the first time period, and the second time period may be similar as described regarding FIG. 4, FIGS. 5A-5C, and FIGS. 6A-6D.

At block 914, the apparatus causes sending of the periodic light source actuation directive to the light source. The sending and the causation of sending may be similar as described regarding FIG. 2, FIG. 4, FIGS. 5A-5C, and FIGS. 6A-6D.

At block 916, the apparatus determines a first shutter control directive for the first near eye apparatus. In at least one example embodiment, the first shutter control directive is configured to cause the first near eye apparatus to be translucent during at least a portion of the first time period and to be opaque during at least a portion of the second time period. The determination and the first shutter control directive may be similar as described regarding FIG. 4, FIGS. 5A-5C, and FIGS. 6A-6D.

At block 918, the apparatus causes sending of the first shutter control directive to the first near eye apparatus. The sending and the causation of sending may be similar as described regarding FIG. 2, FIG. 4, FIGS. 5A-5C, and FIGS. 6A-6D.

At block 920, the apparatus determines a second shutter control directive for the second near eye apparatus. In at least one example embodiment, the second shutter control directive is configured to cause the second near eye apparatus to be translucent during at least a portion of the second time period and to be opaque during at least a portion of the first time period. The determination and the second shutter control directive may be similar as described regarding FIG. 4, FIGS. 5A-5C, and FIGS. 6A-6D.

At block 922, the apparatus causes sending of the second shutter control directive to the second near eye apparatus. The sending and the causation of sending may be similar as described regarding FIG. 2, FIG. 4, FIGS. 5A-5C, and FIGS. 6A-6D.

At block 924, the apparatus receives a profile change directive associated with the first near eye apparatus. The receipt and the profile change directive may be similar as described regarding FIG. 2, FIG. 4, FIGS. 5A-5C, and FIGS. 6A-6D.

At block 926, the apparatus causes changing of the first light preference profile in conformance with the profile change directive based, at least in part, on the profile change directive being associated with the first near eye apparatus. The changing and the causation of changing may be similar as described regarding FIG. 2, FIG. 4, FIGS. 5A-5C, and FIGS. 6A-6D.

Figure 10:
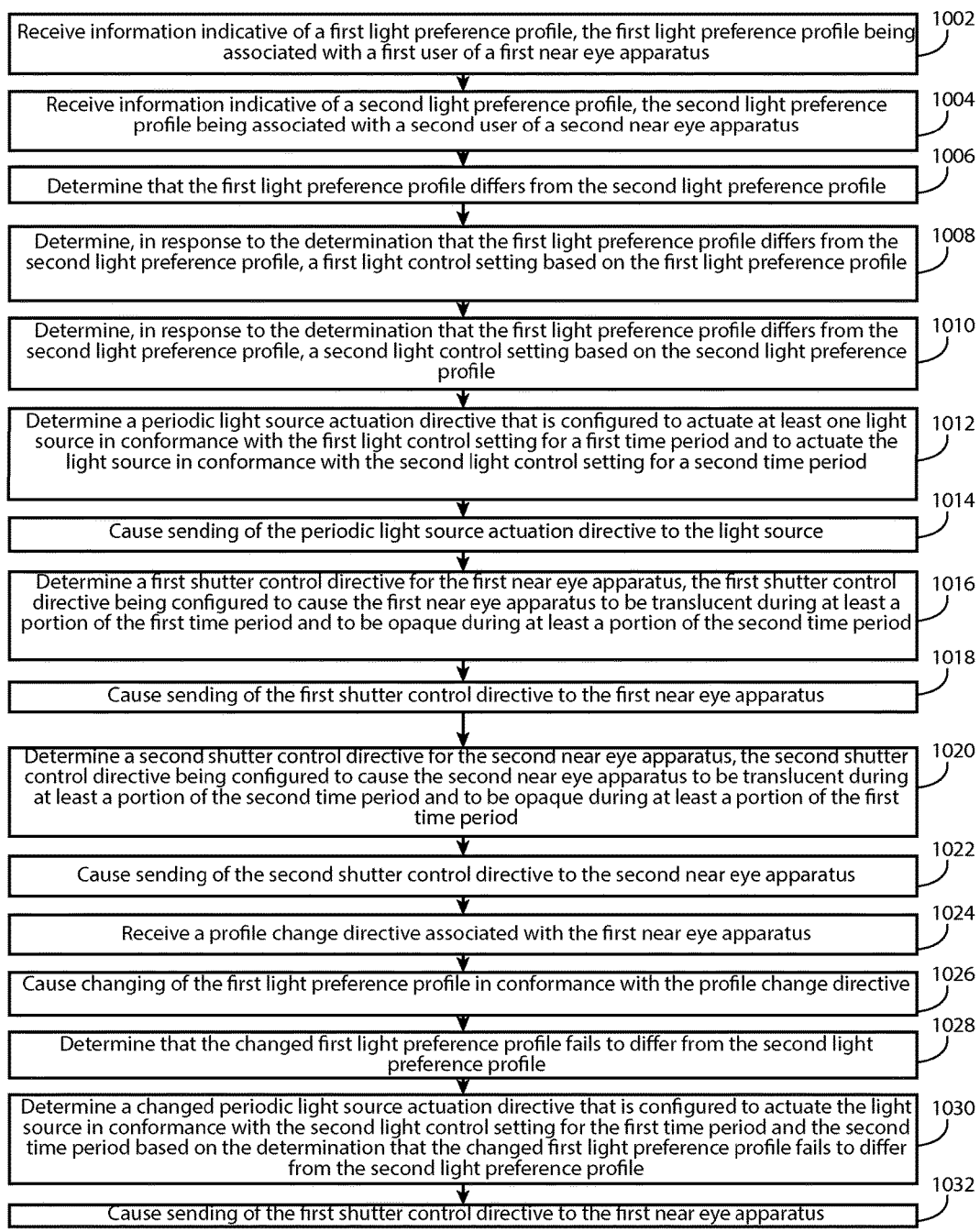
FIG. 10 is a flow diagram illustrating activities associated with receipt of a profile change directive according to at least one example embodiment.

FIG. 10 is a flow diagram illustrating activities associated with receipt of a profile change directive according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in many circumstances, it may be desirable to allow a user to indicate a desire to change a light preference profile and, in response, to cause changing of the light preference profile.

At block 1002, the apparatus receives information indicative of a first light preference profile. In at least one example embodiment, the first light preference profile is associated with a first user of a first near eye apparatus. The receipt, the first light preference profile, the first user, and the first near eye apparatus may be similar as described regarding FIG. 2, FIG. 3, FIG. 4, FIGS. 5A-5C, and FIGS. 6A-6D.

At block 1004, the apparatus receives information indicative of a second light preference profile. In at least one example embodiment, the second light preference profile is associated with a second user of a second near eye apparatus. The receipt, the second light preference profile, the second user, and the second near eye apparatus may be similar as described regarding FIG. 2, FIG. 3, FIG. 4, FIGS. 5A-5C, and FIGS. 6A-6D.

At block 1006, the apparatus determines that the first light preference profile differs from the second light preference profile. The determination may be similar as described regarding FIG. 4, FIGS. 5A-5C, and FIGS. 6A-6D.

At block 1008, the apparatus determines a first light control setting based, at least in part, on the first light preference profile. In at least one example embodiment, the determination of the first light control setting is performed in response to the determination that the first light preference profile differs from the second light preference profile. The determination and the first light control setting may be similar as described regarding FIG. 4, FIGS. 5A-5C, and FIGS. 6A-6D.

At block 1010, the apparatus determines a second light control setting based, at least in part, on the second light preference profile. In at least one example embodiment, the determination of the second light control setting is performed in response to the determination that the first light preference profile differs from the second light preference profile. The determination and the second light control setting may be similar as described regarding FIG. 4, FIGS. 5A-5C, and FIGS. 6A-6D.

At block 1012, the apparatus determines a periodic light source actuation directive that is configured to actuate at least one light source in conformance with the first light control setting for a first time period and to actuate the light source in conformance with the second light control setting for a second time period. The determination, the periodic light source actuation directive, the light source, the actuation of the light source, the first time period, and the second time period may be similar as described regarding FIG. 4, FIGS. 5A-5C, and FIGS. 6A-6D.

At block 1014, the apparatus causes sending of the periodic light source actuation directive to the light source. The sending and the causation of sending may be similar as described regarding FIG. 2, FIG. 4, FIGS. 5A-5C, and FIGS. 6A-6D.

At block 1016, the apparatus determines a first shutter control directive for the first near eye apparatus. In at least one example embodiment, the first shutter control directive is configured to cause the first near eye apparatus to be translucent during at least a portion of the first time period and to be opaque during at least a portion of the second time period. The determination and the first shutter control directive may be similar as described regarding FIG. 4, FIGS. 5A-5C, and FIGS. 6A-6D.

At block 1018, the apparatus causes sending of the first shutter control directive to the first near eye apparatus. The sending and the causation of sending may be similar as described regarding FIG. 2, FIG. 4, FIGS. 5A-5C, and FIGS. 6A-6D.

At block 1020, the apparatus determines a second shutter control directive for the second near eye apparatus. In at least one example embodiment, the second shutter control directive is configured to cause the second near eye apparatus to be translucent during at least a portion of the second time period and to be opaque during at least a portion of the first time period. The determination and the second shutter control directive may be similar as described regarding FIG. 4, FIGS. 5A-5C, and FIGS. 6A-6D.

At block 1022, the apparatus causes sending of the second shutter control directive to the second near eye apparatus. The sending and the causation of sending may be similar as described regarding FIG. 2, FIG. 4, FIGS. 5A-5C, and FIGS. 6A-6D.

At block 1024, the apparatus receives a profile change directive associated with the first near eye apparatus. The receipt and the profile change directive may be similar as described regarding FIG. 2, FIG. 4, FIGS. 5A-5C, and FIGS. 6A-6D.

At block 1026, the apparatus causes changing of the first light preference profile in conformance with the profile change directive based, at least in part, on the profile change directive being associated with the first near eye apparatus. The changing and the causation of changing may be similar as described regarding FIG. 2, FIG. 4, FIGS. 5A-5C, and FIGS. 6A-6D.

At block 1028, the apparatus determines that the changed first light preference profile fails to differ from the second light preference profile. The determination may be similar as described regarding FIG. 4, FIGS. 5A-5C, and FIGS. 6A-6D.

At block 1030, the apparatus determines a changed periodic light source actuation directive that is configured to actuate the light source in conformance with the second light control setting for the first time period and the second time period based, at least in part, on the determination that the changed first light preference profile fails to differ from the second light preference profile. The determination and the changed periodic light source actuation directive may be similar as described regarding FIG. 4, FIGS. 5A-5C, and FIGS. 6A-6D.

At block 1032, the apparatus causes sending of the changed periodic light source actuation directive to the light source. The sending and the causation of sending may be similar as described regarding FIG. 2, FIG. 4, FIGS. 5A-5C, and FIGS. 6A-6D.

Figure 11:
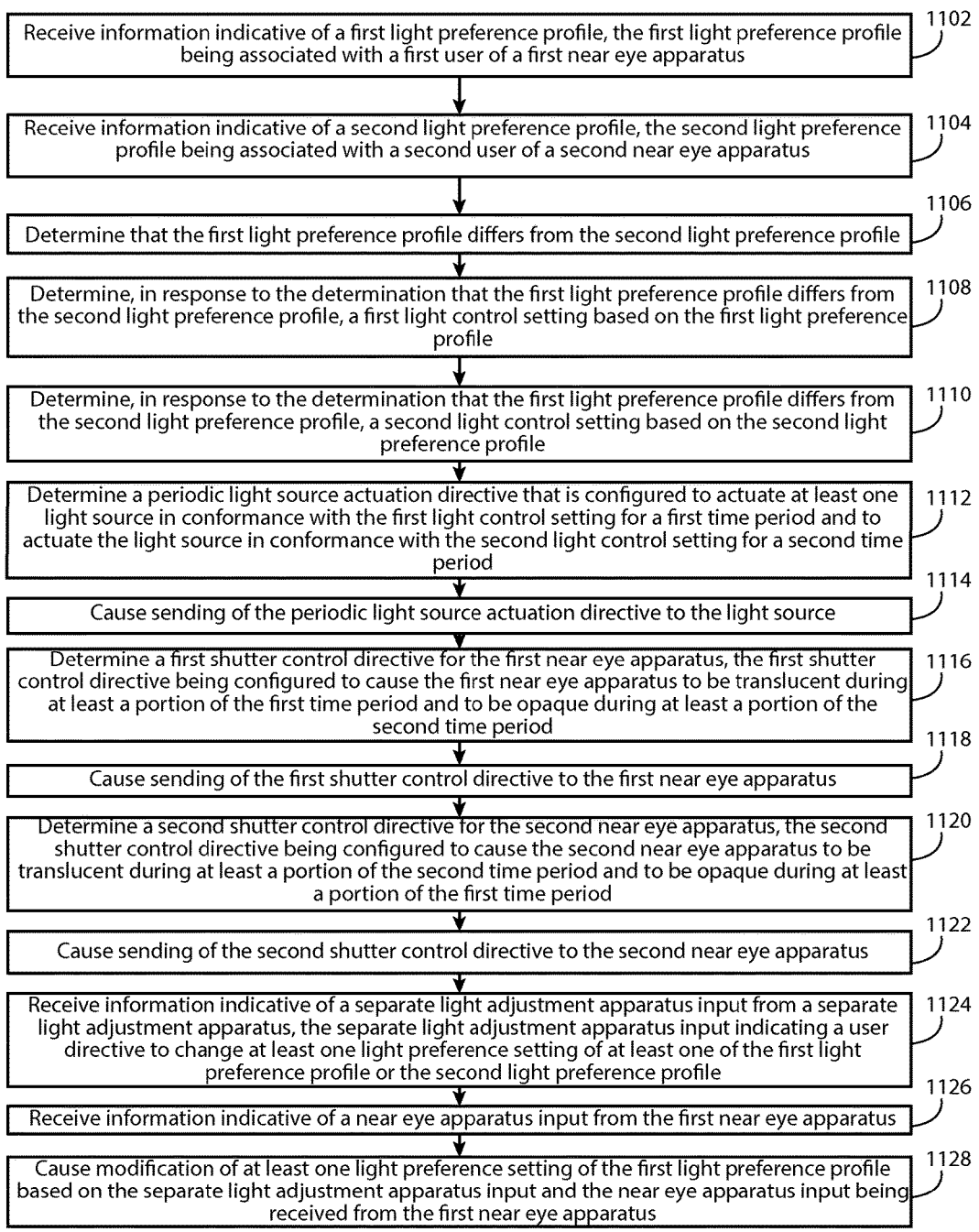
FIG. 11 is a flow diagram illustrating activities associated with causation of modification of a light preference setting according to at least one example embodiment.

FIG. 11 is a flow diagram illustrating activities associated with causation of modification of a light preference setting according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As discussed previously, in many circumstances, it may be desirable to allow a user to indicate a desire to change a light preference profile and, in response, to cause changing of the light preference profile.

At block 1102, the apparatus receives information indicative of a first light preference profile. In at least one example embodiment, the first light preference profile is associated with a first user of a first near eye apparatus. The receipt, the first light preference profile, the first user, and the first near eye apparatus may be similar as described regarding FIG. 2, FIG. 3, FIG. 4, FIGS. 5A-5C, and FIGS. 6A-6D.

At block 1104, the apparatus receives information indicative of a second light preference profile. In at least one example embodiment, the second light preference profile is associated with a second user of a second near eye apparatus. The receipt, the second light preference profile, the second user, and the second near eye apparatus may be similar as described regarding FIG. 2, FIG. 3, FIG. 4, FIGS. 5A-5C, and FIGS. 6A-6D.

At block 1106, the apparatus determines that the first light preference profile differs from the second light preference profile. The determination may be similar as described regarding FIG. 4, FIGS. 5A-5C, and FIGS. 6A-6D.

At block 1108, the apparatus determines a first light control setting based, at least in part, on the first light preference profile. In at least one example embodiment, the determination of the first light control setting is performed in response to the determination that the first light preference profile differs from the second light preference profile. The determination and the first light control setting may be similar as described regarding FIG. 4, FIGS. 5A-5C, and FIGS. 6A-6D.

At block 1110, the apparatus determines a second light control setting based, at least in part, on the second light preference profile. In at least one example embodiment, the determination of the second light control setting is performed in response to the determination that the first light preference profile differs from the second light preference profile. The determination and the second light control setting may be similar as described regarding FIG. 4, FIGS. 5A-5C, and FIGS. 6A-6D.

At block 1112, the apparatus determines a periodic light source actuation directive that is configured to actuate at least one light source in conformance with the first light control setting for a first time period and to actuate the light source in conformance with the second light control setting for a second time period. The determination, the periodic light source actuation directive, the light source, the actuation of the light source, the first time period, and the second time period may be similar as described regarding FIG. 4, FIGS. 5A-5C, and FIGS. 6A-6D.

At block 1114, the apparatus causes sending of the periodic light source actuation directive to the light source. The sending and the causation of sending may be similar as described regarding FIG. 2, FIG. 4, FIGS. 5A-5C, and FIGS. 6A-6D.

At block 1116, the apparatus determines a first shutter control directive for the first near eye apparatus. In at least one example embodiment, the first shutter control directive is configured to cause the first near eye apparatus to be translucent during at least a portion of the first time period and to be opaque during at least a portion of the second time period. The determination and the first shutter control directive may be similar as described regarding FIG. 4, FIGS. 5A-5C, and FIGS. 6A-6D.

At block 1118, the apparatus causes sending of the first shutter control directive to the first near eye apparatus. The sending and the causation of sending may be similar as described regarding FIG. 2, FIG. 4, FIGS. 5A-5C, and FIGS. 6A-6D.

At block 1120, the apparatus determines a second shutter control directive for the second near eye apparatus. In at least one example embodiment, the second shutter control directive is configured to cause the second near eye apparatus to be translucent during at least a portion of the second time period and to be opaque during at least a portion of the first time period. The determination and the second shutter control directive may be similar as described regarding FIG. 4, FIGS. 5A-5C, and FIGS. 6A-6D.

At block 1122, the apparatus causes sending of the second shutter control directive to the second near eye apparatus. The sending and the causation of sending may be similar as described regarding FIG. 2, FIG. 4, FIGS. 5A-5C, and FIGS. 6A-6D.

At block 1124, the apparatus receives information indicative of a separate light adjustment apparatus input from a separate light adjustment apparatus. In at least one example embodiment, the separate light adjustment apparatus input indicates a user directive to change at least one light preference setting of at least one of the first light preference profile or the second light preference profile. The receipt, the separate light adjustment apparatus input, and the separate light adjustment apparatus may be similar as described regarding FIG. 2, FIG. 4, FIGS. 5A-5C, FIGS. 6A-6D, and FIGS. 7A-7C.

At block 1126, the apparatus receives information indicative of a near eye apparatus input from the first near eye apparatus. The receipt and the near eye apparatus input may be similar as described regarding FIG. 2, FIG. 4, FIGS. 5A-5C, FIGS. 6A-6D, and FIGS. 7A-7C.

At block 1128, the apparatus causes modification of at least one light preference setting of the first light preference profile based, at least in part, on the separate light adjustment apparatus input and the near eye apparatus input being received from the first near eye apparatus. The modification and the causation of modification may be similar as described regarding FIG. 2, FIG. 4, FIGS. 5A-5C, FIGS. 6A-6D, and FIGS. 7A-7C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 812 and block 814 of FIG. 8 may be performed after block 818 of FIG. 8. Furthermore, if desired, one or more of the above-described functions may be optional or may be combined. For example, block 806 of FIG. 8 may be optional and/or combined with block 808 of FIG. 8, block 810 of FIG. 8, and/or the like.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
receiving information indicative of a first light preference profile, the first light preference profile being associated with a first user of a first near eye apparatus;
receiving information indicative of a second light preference profile, the second light preference profile being associated with a second user of a second near eye apparatus;
determining that the first light preference profile differs from the second light preference profile;
determining, in response to the determination that the first light preference profile differs from the second light preference profile, a first light control setting based, at least in part, on the first light preference profile;
determining, in response to the determination that the first light preference profile differs from the second light preference profile, a second light control setting based, at least in part, on the second light preference profile;
determining a periodic light source actuation directive that is configured to actuate at least one light source in conformance with the first light control setting for a first time period and to actuate the light source in conformance with the second light control setting for a second time period;
causing sending of the periodic light source actuation directive to the light source;
determining a first shutter control directive for the first near eye apparatus, the first shutter control directive being configured to cause the first near eye apparatus to be translucent during at least a portion of the first time period and to be opaque during at least a portion of the second time period;
causing sending of the first shutter control directive to the first near eye apparatus;
determining a second shutter control directive for the second near eye apparatus, the second shutter control directive being configured to cause the second near eye apparatus to be translucent during at least a portion of the second time period and to be opaque during at least a portion of the first time period; and
causing sending of the second shutter control directive to the second near eye apparatus;
wherein the first light preference profile comprises information indicative of a first lighting scheme preference of the first user of the first near eye apparatus, and wherein the second light preference profile comprises information indicative of a second lighting scheme preference of the second user of the second near eye apparatus.

2. The method of claim 1, wherein the first light preference profile comprises at least a first light preference setting, the second light preference profile comprises at least a second light preference setting, and the determination that the first light preference profile differs from the second light preference profile comprises determination that first light preference setting differs from the second light preference setting.

3. The method of claim 1, further comprising:
receiving information indicative of a separate light adjustment apparatus input from a separate light adjustment apparatus, the separate light adjustment apparatus input indicating a user directive to change at least one light preference setting of at least one of the first light preference profile or the second light preference profile;
receiving information indicative of a near eye apparatus input from the first near eye apparatus; and
causing modification of at least one light preference setting of the first light preference profile based, at least in part, on the separate light adjustment apparatus input and the near eye apparatus input being received from the first near eye apparatus.

4. An apparatus comprising means for performing steps of the method of claim 1.

5. The method of claim 1, further comprising:
receiving a profile change directive associated with the first light preference profile; and
causing changing of the first light preference profile in conformance with the profile change directive.

6. The method of claim 5, wherein the profile change directive is a profile selection directive that designates a third light preference profile.

7. The method of claim 1, further comprising:
determining a changed second shutter control directive for the second near eye apparatus, the changed second shutter control directive being configured to cause the second near eye apparatus to be translucent during at least a portion of the second time period and at least a portion of the first time period; and causing sending of the changed second shutter control directive to the second near eye apparatus.

8. The method of claim 7, wherein the determination of the changed second shutter control directive is performed in response to the determination that the changed first light preference profile fails to differ from the second light preference profile.

9. The method of claim 7, wherein the changed second shutter control directive is configured to preclude opacity of the second near eye apparatus.

10. The method of claim 1, further comprising:
determining that the changed first light preference profile fails to differ from the second light preference profile;
determining a changed periodic light source actuation directive that is configured to actuate the light source in conformance with the second light control setting for the first time period and the second time period based, at least in part, on the determination that the changed first light preference profile fails to differ from the second light preference profile; and
causing sending of the changed periodic light source actuation directive to the light source.

11. The method of claim 10, further comprising:
determining a changed first shutter control directive for the first near eye apparatus, the changed first shutter control directive being configured to cause the first near eye apparatus to be translucent during at least a portion of the first time period and at least a portion of the second time period; and
causing sending of the changed first shutter control directive to the first near eye apparatus.

12. The method of claim 11, wherein the determination of the changed first shutter control directive is performed in response to the determination that the changed first light preference profile fails to differ from the second light preference profile.

13. The method of claim 11, wherein the changed first shutter control directive is configured to preclude opacity of the first near eye apparatus.

14. An apparatus comprising:
at least one processor; and
at least one non-transitory memory, the non-transitory memory comprising machine-readable instructions, where the at least one non-transitory memory and the machine-readable instructions are configured to, with the at least one processor, cause the apparatus to:
receive information indicative of a first light preference profile, the first light preference profile being associated with a first user of a first near eye apparatus;
receive information indicative of a second light preference profile, the second light preference profile being associated with a second user of a second near eye apparatus;
determine that the first light preference profile differs from the second light preference profile;
determine, in response to the determination that the first light preference profile differs from the second light preference profile, a first light control setting based, at least in part, on the first light preference profile;
determine, in response to the determination that the first light preference profile differs from the second light preference profile, a second light control setting based, at least in part, on the second light preference profile;
determine a periodic light source actuation directive that is configured to actuate at least one light source in conformance with the first light control setting for a first time period and to actuate the light source in conformance with the second light control setting for a second time period;
cause sending of the periodic light source actuation directive to the light source;
determine a first shutter control directive for the first near eye apparatus, the first shutter control directive being configured to cause the first near eye apparatus to be translucent during at least a portion of the first time period and to be opaque during at least a portion of the second time period;
cause sending of the first shutter control directive to the first near eye apparatus;
determine a second shutter control directive for the second near eye apparatus, the second shutter control directive being configured to cause the second near eye apparatus to be translucent during at least a portion of the second time period and to be opaque during at least a portion of the first time period; and
cause sending of the second shutter control directive to the second near eye apparatus;
wherein the first light preference profile comprises information indicative of a first lighting scheme preference of the first user of the first near eye apparatus, and wherein the second light preference profile comprises information indicative of a second lighting scheme preference of the second user of the second near eye apparatus.

15. A non-transitory program storage device readable by a machine, tangibly embodying a program of instructions executable by the machine for performing operations, the operations comprising:
receiving information indicative of a first light preference profile, the first light preference profile being associated with a first user of a first near eye apparatus;
receiving information indicative of a second light preference profile, the second light preference profile being associated with a second user of a second near eye apparatus;
determining that the first light preference profile differs from the second light preference profile;
determining, in response to the determination that the first light preference profile differs from the second light preference profile, a first light control setting based, at least in part, on the first light preference profile;
determining, in response to the determination that the first light preference profile differs from the second light preference profile, a second light control setting based, at least in part, on the second light preference profile;
determining a periodic light source actuation directive that is configured to actuate at least one light source in conformance with the first light control setting for a first time period and to actuate the light source in conformance with the second light control setting for a second time period;
causing sending of the periodic light source actuation directive to the light source;
determining a first shutter control directive for the first near eye apparatus, the first shutter control directive being configured to cause the first near eye apparatus to be translucent during at least a portion of the first time period and to be opaque during at least a portion of the second time period;
causing sending of the first shutter control directive to the first near eye apparatus;
determining a second shutter control directive for the second near eye apparatus, the second shutter control directive being configured to cause the second near eye apparatus to be translucent during at least a portion of the second time period and to be opaque during at least a portion of the first time period; and causing sending of the second shutter control directive to the second near eye apparatus;

wherein the first light preference profile comprises information indicative of a first lighting scheme preference of the first user of the first near eye apparatus, and wherein the second light preference profile comprises information indicative of a second lighting scheme preference of the second user of the second near eye apparatus.

* * * * *